(12) United States Patent
Yabe

(10) Patent No.: US 6,757,006 B1
(45) Date of Patent: Jun. 29, 2004

(54) MOVING TROUBLE MONITORING SYSTEM AND RECORDING MEDIUM

(75) Inventor: Tomoyoshi Yabe, Aichi (JP)

(73) Assignee: Nichiha Corporation, Nagoya (JP)

( * ) Notice: Subject to any disclaimer, the term of this patent is extended or adjusted under 35 U.S.C. 154(b) by 0 days.

(21) Appl. No.: 09/469,174

(22) Filed: Dec. 21, 1999

(30) Foreign Application Priority Data

Dec. 22, 1998 (JP) ............................................. 10-363850

(51) Int. Cl.[7] ............................. H04N 7/18; H04N 9/47
(52) U.S. Cl. ............................. 348/86; 348/94; 348/95; 348/575; 382/164
(58) Field of Search .............................. 348/86, 94, 95, 348/575; 382/164

(56) References Cited

U.S. PATENT DOCUMENTS

| | | | | |
|---|---|---|---|---|
| 5,450,500 A | * | 9/1995 | Brett | 382/162 |
| 5,467,402 A | * | 11/1995 | Okuyama et al. | 382/104 |
| 6,211,905 B1 | * | 4/2001 | Rudt | 348/88 |
| 6,373,529 B1 | * | 4/2002 | Brett | 348/571 |

FOREIGN PATENT DOCUMENTS

| | | |
|---|---|---|
| JP | 2706033 | 10/1997 |
| JP | 2763169 | 3/1998 |

* cited by examiner

*Primary Examiner*—Chris Kelley
*Assistant Examiner*—Charles Parsons
(74) *Attorney, Agent, or Firm*—Shook, Hardy & Bacon LLP

(57) ABSTRACT

A monitoring system for watching moving trouble of work boards, which is capable of informing of trouble of boards immediately after trouble occurs in the continuous production line, and capable of displaying a monitored picture which is modified into a special picture to prevent the picture from becoming monotonous. This system includes a TV camera for photographing a moving scene of work boards, a display device for displaying an image signal of the moving scene of work boards taken by the TV camera, and an image processing means for replacing at least a portion of that image signal of the moving scene of work boards by a predetermined first color image signal.

8 Claims, 18 Drawing Sheets

FIG.11A
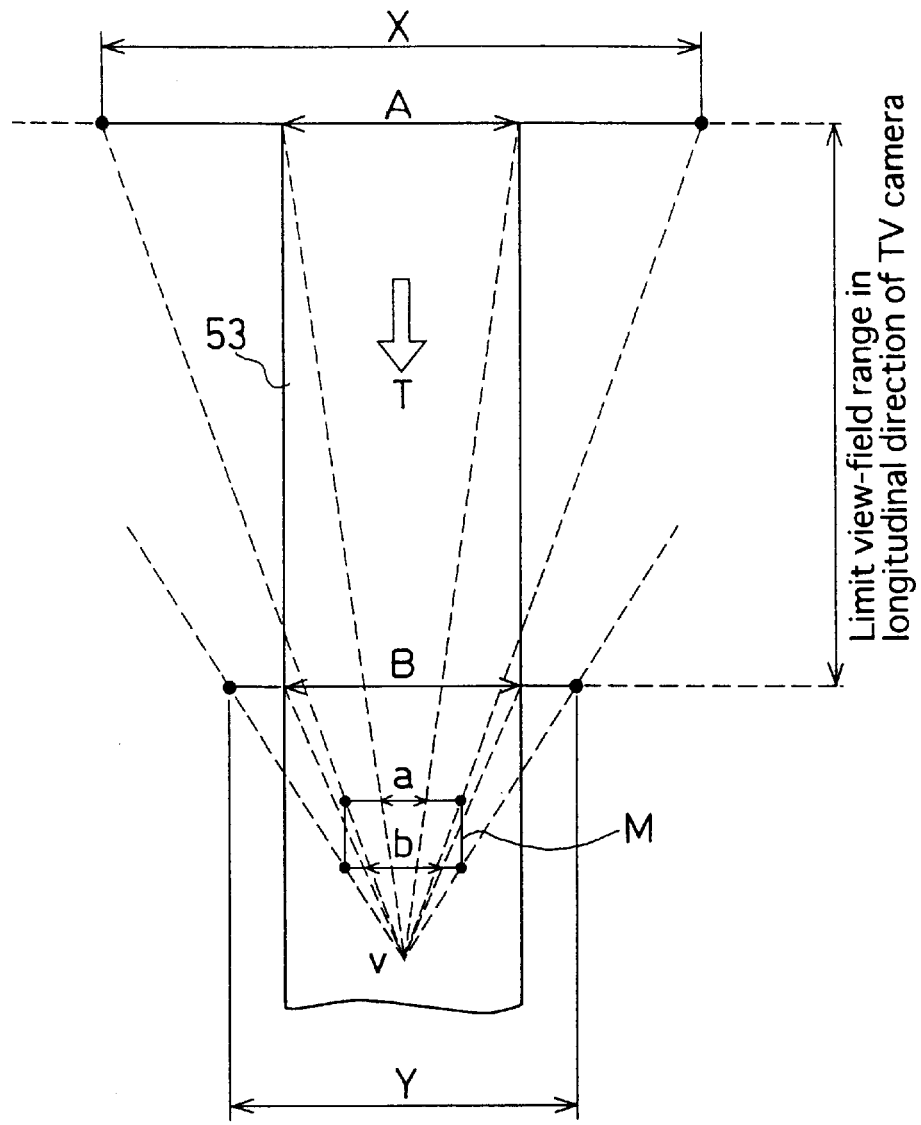
FIG.11B
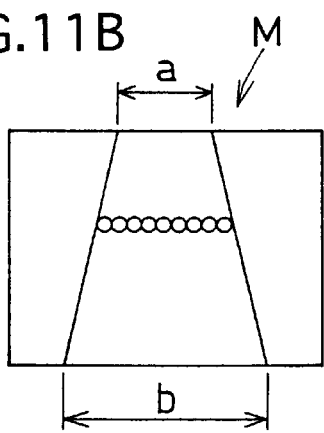
FIG.11C
Table A
| Scanning line No. | Distance/Number of pixel |
|---|---|
| 1 | X/640 |
| 2 | ⋮ |
| ⋮ | ⋮ |
| 480 | Y/640 |

FIG.12A
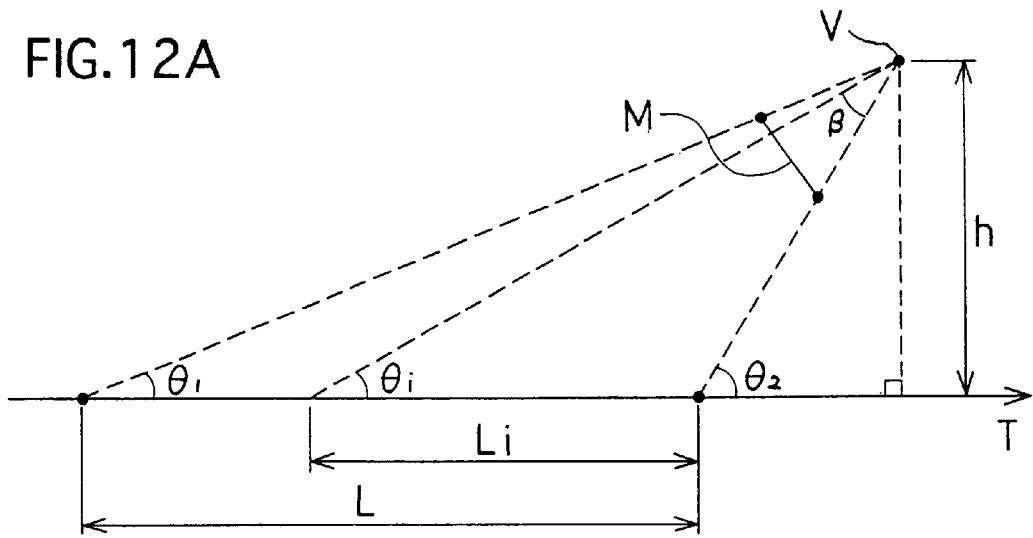
FIG.12B
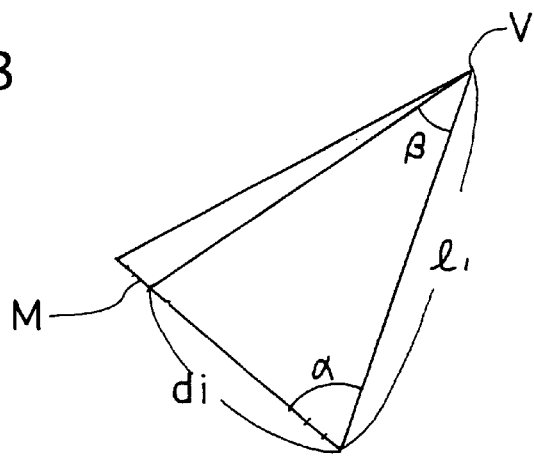
FIG.12C
Table B
| Scanning line No. | Distance of position of scanning line |
|---|---|
| 1 | L |
| 2 | $L_1$ |
| 3 | $L_2$ |
| ⋮ | ⋮ |
| 480 | 0 |

MOVING TROUBLE MONITORING SYSTEM AND RECORDING MEDIUM

BACKGROUND OF THE INVENTION

1. Field of the Invention

The present invention relates to a monitoring system for watching moving trouble of boards to be worked (hereinafter referred to as work boards) and to a recording medium, and in particular, to moving trouble monitoring system for work boards wherein the moving condition of boards to be transferred from one place to another during the working process of boards such as building boards is watched to see if there is any moving trouble of boards, and if any moving trouble of boards is happened to be generated, the trouble is immediately detected and informed through the monitoring system thereby enabling the trouble to be suitably remedied. The present invention also relates to a medium to be employed in the monitoring system.

2. Description of the Related Arts

In the conventional continuous manufacturing and working line of building boards such as the coating line of building boards, work boards are placed into the line one by one in a predetermined cycle so as to successively execute required treatments thereof including a pretreatment, a main treatment, a post-treatment, etc., thereby obtaining the finished product of boards. Thereafter, the finished boards are further subjected to an inspection procedure before the finished boards are packed into a unit comprising several pieces of the finished boards and then discharged from the line for the preparation of shipment thereof (or for the storage thereof in a store house).

These working processes are generally constructed in such a manner that some of sequential working steps are linked to or combined with each other in the manufacturing and working line of building boards. Therefore, if any one of these combined working processes which are sequentially linked to each other is failed to be normally executed, it is impossible to obtain the finished boards. This kind of trouble in the production process is peculiar to the aforementioned continuous production system.

In the aforementioned continuous production system, these combined working processes are linked all together by means of a transferring line through which these work boards are transferred, and a large number of these work boards are intermittently placed one by one into the manufacturing and working line, thereby allowing these work boards to individually move along the manufacturing and working line. As these work boards move passing through working positions which are intermittently and sequentially positioned along the manufacturing and working line, these work boards are sequentially subjected to each working process which is specific to each working position in the line.

To improve the productivity, two or more of the aforementioned manufacturing and working lines are often installed parallel with each other.

As for the moving means (transferring means) of work boards which is installed contiguously throughout the manufacturing and working line thereby connecting the working positions with each other, a roller conveyor or a tape conveyor is extensively employed. The transferring system of this kind functions effectively as a transferring means for the work boards in a situation where the positional accuracy of the moving boards is not so stringent. For example, there are many cases which require to change the moving direction of work boards in relative to the layout of the plant. If the moving direction of work boards is required to be changed, it is generally controlled such that the movement of the moving boards is temporarily stopped at the position where the moving direction of work boards is required to be changed, and immediately after which, the moving of work boards is resumed. In this case, the working boards are frequently subjected to a varying speed control of: decelerating movement→stop→accelerating movement→uniform velocity movement. Further, when an average working speed is increased in this case to as high as 60 m/min. For instance, various trouble phenomena such as the vibration or slippage of the work boards may be caused to generate during the moving thereof. It is certainly meaningless under such relatively rough moving conditions to try to improve the accuracy of the moving position of work boards. Namely, if only the transfer of work boards from one place to another is intended, the accuracy of the moving position of work boards may not be required to be stringent.

Even in such a case as mentioned above, unless work boards are transferred with a certain accuracy along a predetermined moving route thereof, there would be much possibility that the moving trouble of work boards such as the snaking or collision of work boards, or in the worst case, a fatal trouble such as the falling of work boards from the transferring line may be caused to generate.

If such trouble situation as mentioned above is caused to generate, the trouble situation should be immediately detected and any suitable countermeasures should be immediately taken so as to remedy the trouble situation. However, if the discovery of the trouble situation is retarded, the damage resulting from such trouble situation would be gradually magnified in proportion to the retardation of the discovery. This kind of trouble in relative to the moving trouble of work boards is peculiar to the aforementioned continuous production system.

To cope with the aforementioned accidents, most of the manufacturing and working lines of continuous production system, irrespective of the products to be worked therein, are constructed such that a monitoring TV camera is installed at every key points of the manufacturing and working line so as to always watch the line in the monitoring field of the camera to see if there is or is not any trouble in the moving of the pieces of work boards to be treated, the scenes taken by the TV camera being always displayed in a remote control chamber or in a management room, thereby supervising the manufacturing and working line.

However, in spite of the fact that the scenes displayed in the monitoring TV represent the real-time situations of the key points, there is much possibility that the generation of trouble in the moving of the pieces of work boards is inadvertently overlooked by a person in charge unless the scene displayed in the monitoring TV is very carefully watched.

It is quite conceivable that the picture displayed in a monitoring TV is quite monotonous to the eyes of the person in charge thereof. More specifically, a monitoring TV camera takes the picture of the same scene all the time, so that the monitoring work to carefully watch the display screen for a long time for finding any generation of trouble in the moving of the pieces of work boards, which probability being generally extremely low, is a heavy burden on the person in charge thereof. Namely, since there is little change in the displayed picture of the scene as long as the working line is normally operated, it is quite conceivable that the picture displayed in a monitoring TV is quite monotonous in image to the eyes of the person in charge thereof.

SUMMARY OF THE INVENTION

The present invention has been made under the aforementioned circumstances, and therefore an object of the present invention is to provide a monitoring system for watching moving trouble of work boards, which is capable of informing a person in charge of any moving trouble of boards immediately after it is generated in the continuous production line, and at the same time, capable of displaying a monitored picture which is modified into a special picture through the processing of the real picture taken by a TV camera, thereby preventing the picture from becoming monotonous to the person in charge of watching the monitored picture and enabling the person in charge to quite easily recognize and confirm the situation on the production line. A further object of the present invention is to provide a recording medium to be employed in the aforementioned moving trouble monitoring system.

Namely, according to the present invention, there is provided moving trouble monitoring system for work boards, which comprises a TV camera for photographing a moving scene of work boards, and a display device for displaying an image signal of the moving scene of work boards taken by the TV camera, which is featured in that said system further comprises an image processing means for replacing at least a portion of said image signal of the moving scene of work boards by a predetermined first color image signal.

If the aforementioned "at least a portion of said image signal of the moving scene of work boards" is constituted by a profile of the work boards, the profile of the work boards can be made more distinctive as it is colored with orange color for instance, and at the same time, the pattern of the work boards can be also displayed.

Further, if the aforementioned image processing means is constructed to enable it to determine whether or not an input image signal derived is originated from the work boards on the basis of the magnitude of difference between the input signal and a background image signal prepared in advance, the work boards can be enabled to be detected in the form of a simple construction.

Additionally, if the aforementioned system is further provided with trouble detecting means for detecting that said first color image signal is existing in a predetermined region, and with an alarm means for informing trouble if any on the basis of a detection output from said trouble detecting means, the off-course of work boards out of predetermined moving control zone can be detected and informed of.

Further, if the aforementioned image processing means is constructed to enable an image signal of aforementioned predetermined region to be replaced by a predetermined second color image signal (for example, the moving control lines are displayed by yellow), the trouble in moving of work boards can be easily detected by simply watching the display device.

Furthermore, if the aforementioned system is further provided with trouble detecting means for detecting that a pair of neighboring first color image signals have approached to each other within a predetermined distance on the display screen, and with an alarm means for informing trouble if any on the basis of a detection output from said trouble detecting means, the approaching of neighboring work boards can be detected and informed of.

If the aforementioned image processing means is constructed such that the display screen is partitioned into two regions, i.e., a first region and a second region, and that an image signal in the first region is replaced by a third color image signal, while the brightness of image signal in the second region is suppressed (for example, stationary portions are displayed in green, while animation regions are displayed with a suppressed brightness), the first color image signal of the work boards can be intensified.

There is also provided by the present invention a recording medium which is readable by a computer and stores therein a program for enabling the computer to function as an image processing means of the moving trouble monitoring system.

The specification includes part or all of the contents disclosed in the specification and/or drawings of Japanese Patent Application No. 10-363850, which is a priority application of the present application.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 11A and 11B show respectively a schematic diagram explaining the principle of correcting a discrepancy of a distance between the pixels in the lateral direction that is caused to occur depending on the position of the scanning line, and FIG. 11C shows a relationship between the distance and the number of pixel;

FIGS. 12A and 12B show respectively a schematic diagram explaining the principle of correcting a discrepancy of a distance between the scanning lines that is caused to occur depending on the position of the scanning line, and FIG. 12C is a table showing the distance between the scanning lines;

DESCRIPTION OF THE PREFERRED EMBODIMENTS

Preferable embodiments of the present invention will be explained with reference to the drawings.

Figure 1:
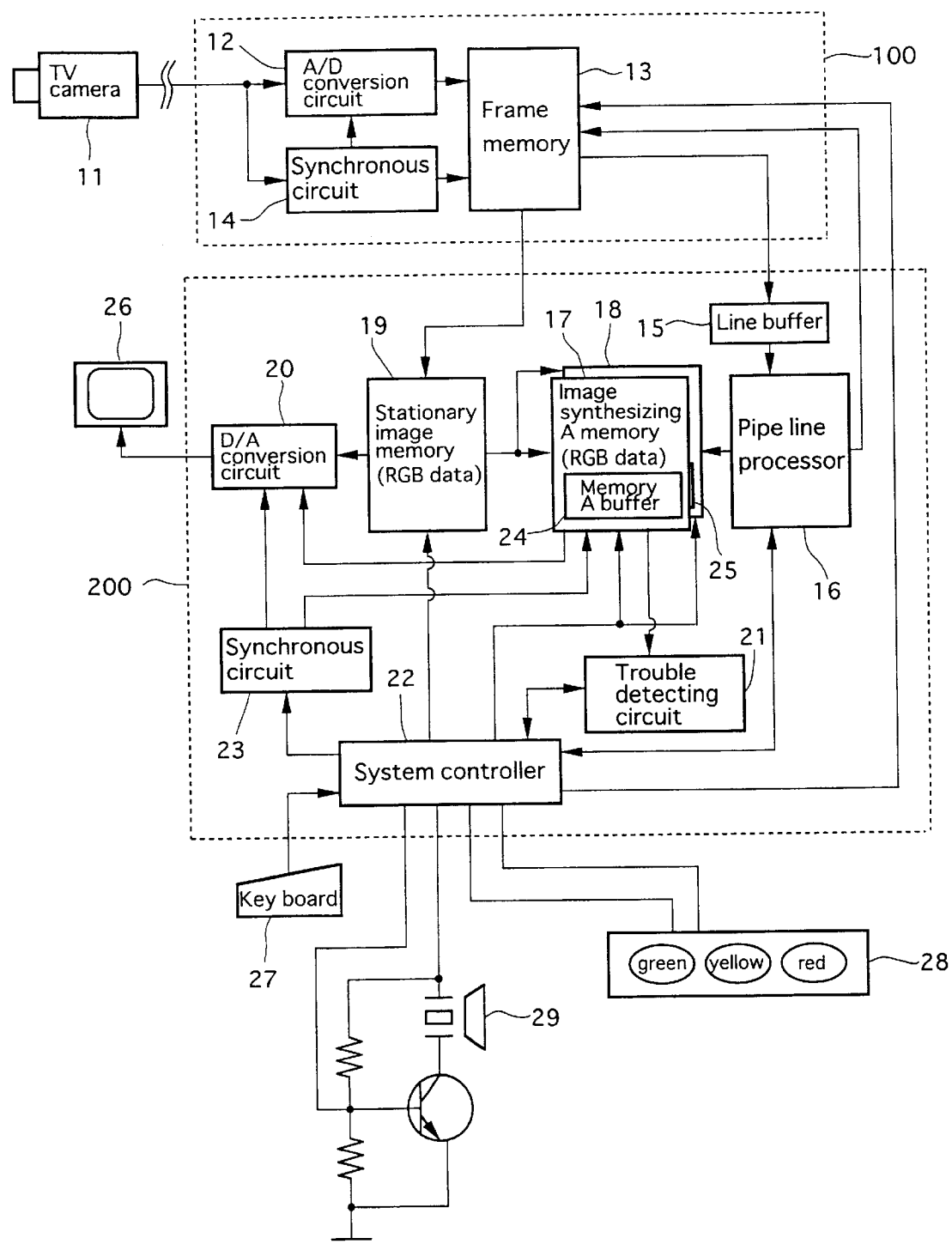
FIG. 1 is a block diagram showing the construction of the moving trouble monitoring system according to one embodiment of the present invention.

FIG. 1 shows the construction of the moving trouble monitoring system according to one embodiment of the present invention. An image signal from a TV camera 11 which is installed to photographing the moving scene of work boards is data output into an image input board 100. This image input board 100 comprises an A/D conversion circuit 12 for converting an analog image signal derived from the TV camera 11 into a digital image signal, a frame memory 13 for storing, in the form of frame unit, a monochrome sampling pixel data and a reference pixel data, and a synchronous circuit 14 data outputting a synchronous signal which has been separated from the image signal from the TV camera 11 to the A/D conversion circuit 12 as well as to the frame memory 13. By making use of a dual port memory as the frame memory 13, the fetch of an image and the reading and writing of data can be concurrently performed in parallel with each other. Namely, without waiting for the finishing of the fetch of one image, the transfer of data can be started. The image signal from the image input board 100 is data output to an image processor 200. This image processor 200 is composed of a line buffer 15 which is a temporary storage memory in the unit of scanning line which is capable of storing the sampling image data signal and differential data signal to be derived from the frame memory 13, a pipe line processor 16 for separately processing the image signal of a moving body or work board and the image signal of quasi-moving body or the upper portion of transferring means which are separated based on the differential data signal stored in the line buffer 15, an image synthesizing B memory 18 for storing an image signal processed by the pipe line processor 16, an image synthesizing A memory 17 for storing an image signal for display, a stationary image memory 19 for storing the image signal of a static body, a D/A conversion circuit 20 for converting the digital image signal stored in a memory into an ordinary analog image signal, a moving trouble detecting circuit 21 for detecting the moving trouble of work boards by detecting a fact that the work boards are displayed in an undesirable state on the image synthesizing A memory 17, a system controller 22 for instructing each memory or processor to execute a reading or processing, and a synchronous circuit 23 for synchronizing the operation of the image synthesizing A memory 17 with that of the D/A conversion circuit 20 upon receipt of a timing pulse to be produced by the system controller 22.

The image synthesizing A memory 17 is provided with a memory A buffer 24 which is designed to store the address data of a couple of the moving control lines. On the other hand, the image synthesizing B memory 18 is provided with a memory B buffer 25 which is designed to store the address data of four representative points defining the boundary of the stationary portions. The D/A conversion circuit 20 is connected with a monitor display 26 for displaying the image signal that has been analog-converted, while the system controller 22 is connected with a key board 27 for carrying out a data input, with a moving condition informing lamp for giving a visual warning, and with an alarm buzzer 29 for giving an audible warning.

Figure 2A:
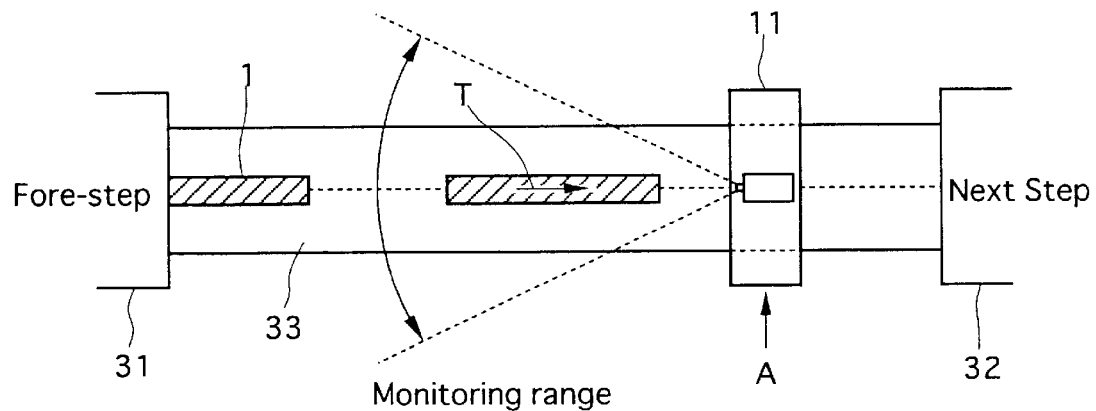
FIGS. 2A and 2B show respectively a schematic view explaining one example of installing a TV camera.
Figure 2B:
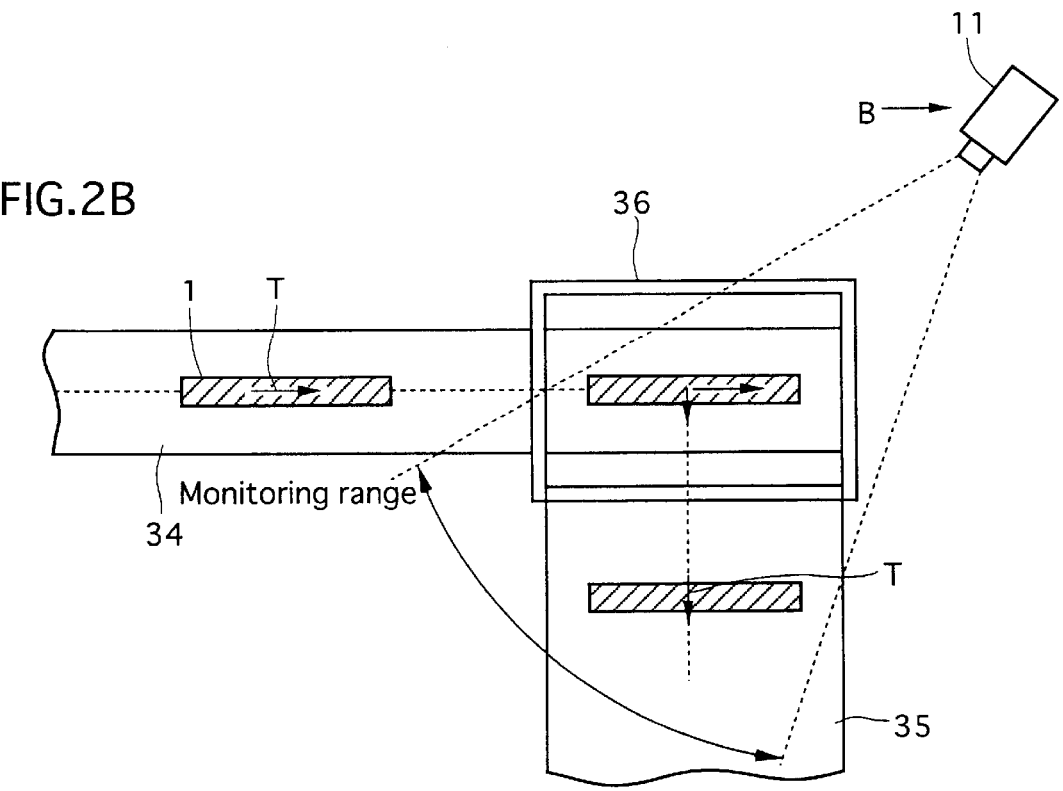

FIG. 2 illustrates examples of installing the TV camera 11, wherein FIG. 2A shows one example wherein the TV camera 11 is disposed at the linear runway of a moving boards 1. Specifically, the TV camera 11 is positioned at the position A which enables the TV camera 11 to watch the moving scene of the moving boards 1 running along the transferring zone 33 between the fore step 31 and the next step 32 from a place which is obliquely higher and downstream in the moving direction T in relative to the position of the moving boards 1 being watched. The angle of the TV camera 11 is set such that the moving state of at least two of the moving boards 1 can be monitored under the ordinary transferring condition. On the other hand, FIG. 2B shows another example wherein the TV camera 11 is disposed at the turning point of moving direction at which the moving boards 1 are caused to turn from the #1 transferring zone 34 to the #2 transferring zone 35. In this case also, the TV camera 11 is positioned at a position B which enables the TV camera 11 to watch a direction-turning means 36 from a place which is obliquely higher in relative to the position of the direction-turning means 36, and the angle of the TV camera 11 is set such that the moving state of at least two of the moving boards 1 can be monitored under the ordinary transferring condition.

Figure 3A:
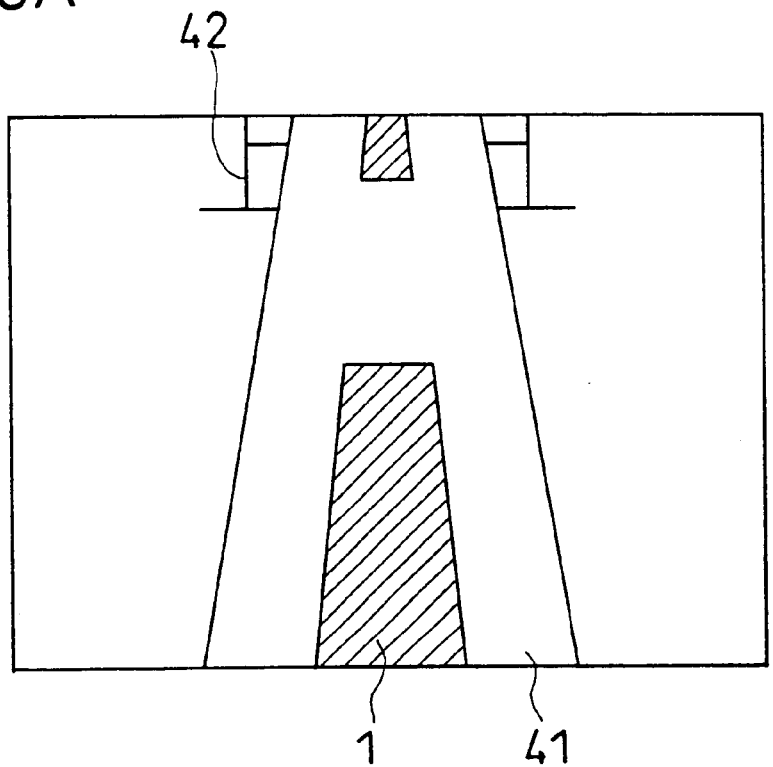
FIGS. 3A and 3B show respectively a schematic diagram illustrating one example of display that can be seen in a monitoring display screen.
Figure 3B:
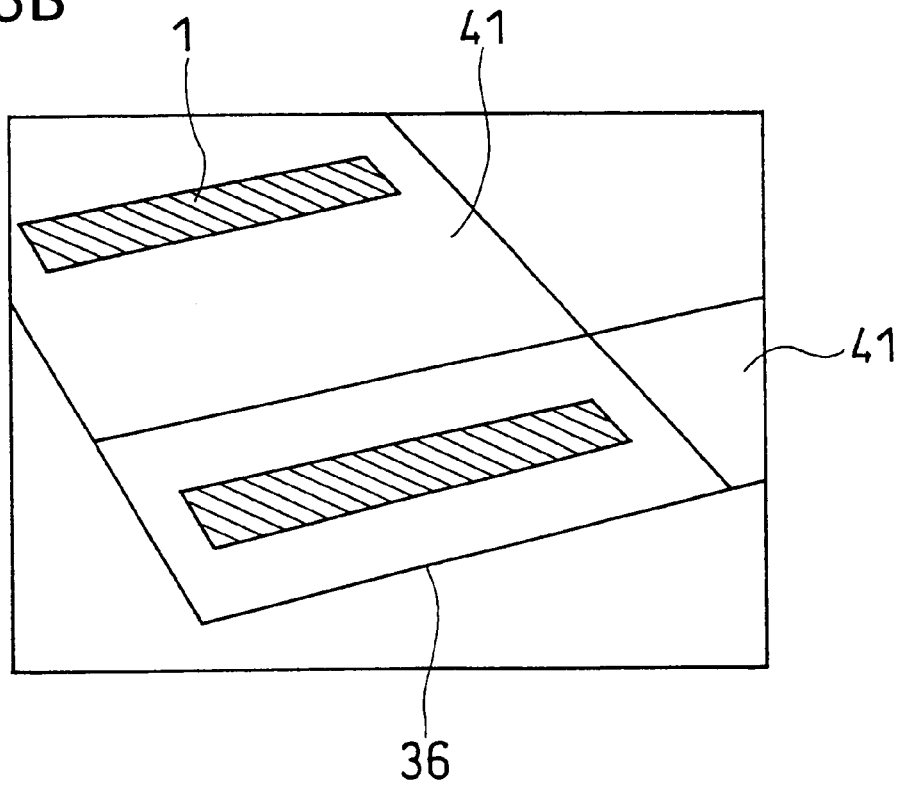

FIG. 3 illustrates examples of picture displayed in the monitor display 26, wherein the signal processing which is the characteristics of the present invention is not yet actuated. FIGS. 3A and 3B correspond respectively with FIG. 2A where a linear runway is shown and with FIG. 2B where the turning of runway in direction is shown. In FIGS. 3A and 3B, the moving boards 1, the transferring means 41, a portion of the outlet port 42 of the fore-step 31, and the direction-turning means 36 are illustrated. These features as well other features including the background are displayed in the same manner as that of the ordinary television.

Figure 4A:
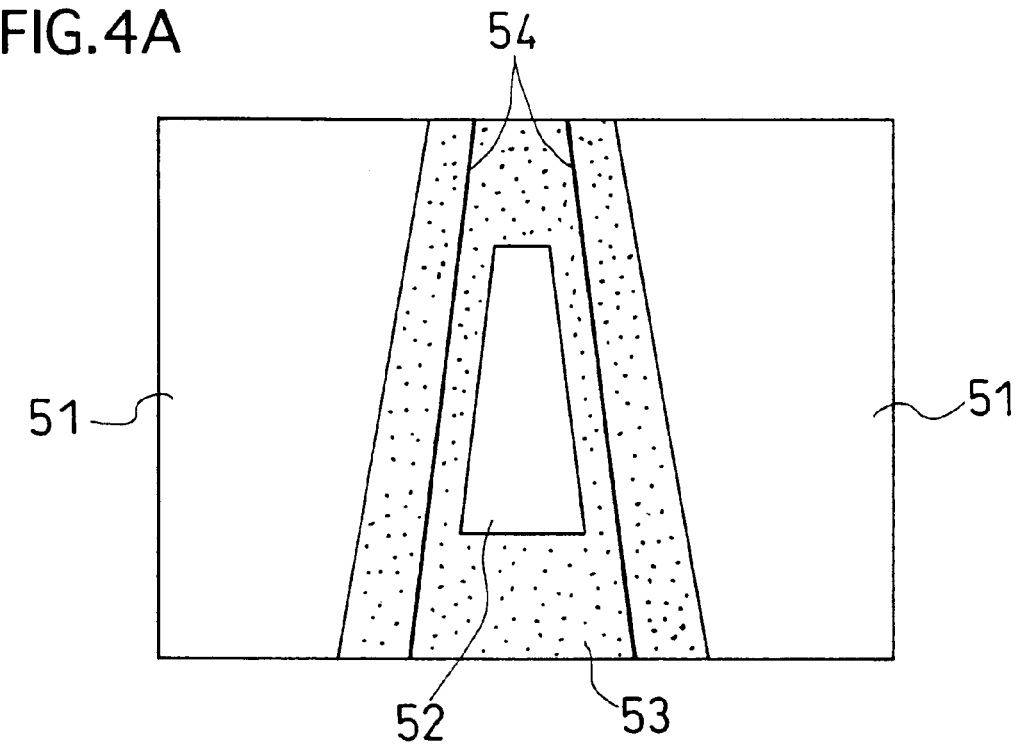
FIGS. 4A and 4B show respectively a schematic diagram illustrating one example of display that can be seen in a monitoring display screen according to the present invention.
Figure 4B:
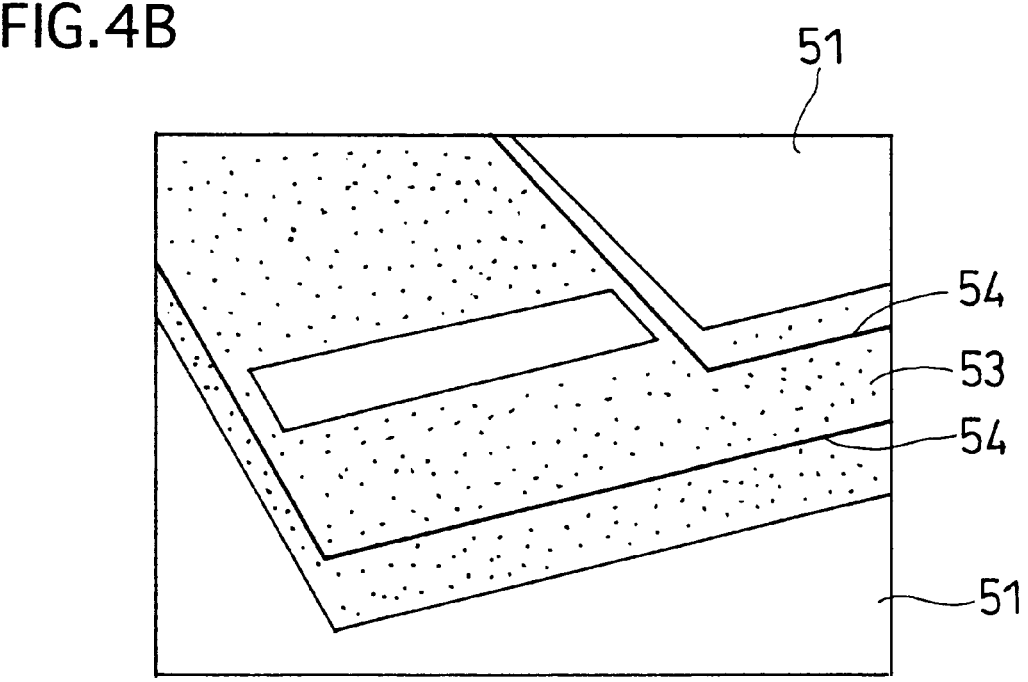

FIG. 4 illustrates examples of picture displayed in the monitor display 26 according to one embodiment of the present invention. FIGS. 4A and 4B correspond respectively with FIG. 2A where a linear runway is shown and with FIG. 2B where the turning of runway in direction is shown. In FIGS. 4A and 4B, the scene being photographed by the TV camera 11 is differentiated into tree distinctive image sections each having specific different characteristics, i.e., a stationary portion 51, an animation portion 52, and quasi-animation portion 53.

The stationary portion 51 is a stationary image portion which is free from any influence of the movement of the moving boards 1 or of the transferring means 41, so that the position thereof is always fixed in the monitored picture even during the monitoring operation. Accordingly, the details of the content of picture in this stationary portion 51 is completely disregarded, and, in the monitored picture, this stationary portion 51 is entirely displayed with a single color, e.g., green of predetermined density and as a stationary image (plain background image) as if it covers a portion of the animation display region.

The quasi-animation portion 53 mainly represents the flat portion constituting the upper surface of the transferring means 41 forming the transferring zones 33, 34 and 35 of the moving boards 1. Although some portions thereof such as the transferring rollers are actuated to perform a rotational movement, the quasi-animation portion 53 is as a whole represented by an image where the position thereof is generally fixed in the displayed image. Accordingly, the brightness of the image signal being data output to this quasi-animation portion 53 is suppressed to turn it into a darker image signal, which is then displayed in an animation display region. In this case, the brightness signal being data output may be converted into the same color (green) as that of the stationary image portion 51, thereby allowing it to be displayed as a shaded green color image. Further, a couple of right and left moving control lines 54, each being a straight line having a predetermined width and colored yellow, are fixedly displayed at a predetermined portion of this animation display region.

The animation portion 52 represents the image of the moving boards 1 per se which are designed to move inside the animation display region representing the transferring zones 33, 34 and 35 of the moving boards 1. In this case, the design of pattern formed on the surface of the moving boards 1 may be completely disregarded, and only the profile thereof is kept alive, so that this animation portion 52 is entirely displayed with a single color, e.g., orange color. Alternatively, only the profile of the animation portion 52 may be colored in orange color with the design of the remaining central region of the animation portion 52 being left to remain as it is. If the animation portion 52 is processed in this manner, not only the orange profile of the moving boards 11 but also the design thereof can be displayed in the monitor display 26.

When the entire region of the picture to be displayed is distinctively colored in the aforementioned manner, the entire features of the picture, as it is viewed at a distance, can be distinguished as a whole by these three colored configurations, i.e., the shape of the moving boards 1 (which is the animation portion 52 having orange color), a couple of moving control lines 54 (which is colored yellow), and the residual background portions (which are the stationary portion 51 having a greenish color, and the quasi-animation portion 53 having a greenish color). As a result, the stationary portion 51, the quasi-animation portion 53 and a couple of the moving control lines 54 are displayed at the fixed position of the monitoring screen, and only the animation portion 52 representing the moving boards 1 is movably displayed within the region of the quasi-animation portion 53. Therefore, it would become quite easy for a person in charge to recognize and confirm the configuration of the moving boards 1 as well as the change in dynamic position of the moving boards 1.

According to this embodiment, since the image signal that has been input is required to be digitally processed in real time (video rate) and at a high speed, the burden on the hard ware would be increased as compared with analog processing. Therefore, it may be more advisable to adopt the co-use of a local parallel processing and a pipe line processing.

This local parallel processing is a kind of a high speed processing method wherein the access of data and the arithmetic processing are performed parallel for a local region of 3×3 to 15×15, and this local processing is applied to the entire picture through a serial scanning. On the other hand, the pipe line processing is a kind of a high speed processing method wherein an image data is continuously data output to a plurality of processing modules which are connected in the form of pipe line so as to continuously obtain processed results after a predetermined delay time.

According to this embodiment, the image of moving boards 1 is detected from the sampling image data that have been stored in the frame memory 13, so that the aforementioned local region in the frame memory 13 is employed as one pixel, which is then subjected to a parallel processing. The content of the processing is an arithmetic processing to determine a difference between the image data recorded in advance and constituting a reference and the image data at the same position that have been sampled. This arithmetic processing takes into account the fact that not only the image to be employed as a reference under the condition where the moving boards 1 is not existed, but also the image to be compared with under the condition where the moving boards 1 is existed have fluctuating level of brightness of individual pixel constituting each of these images, and have multi-valued level, it is impossible to determine a threshold value that can be adopted as a reference. Namely, depending on the color and ruggedness of the surface of the moving boards 1, the value of brightness thereof may be larger or smaller than or identical with that of the data of reference value. Therefore, the difference in brightness is fetched, and based upon this difference, a detection is then performed to determine whether the state wherein the value of the difference exceeds over a predetermined threshold value is roughly continued or not, thereby pseudo-binarizing the value of brightness.

Figure 5:
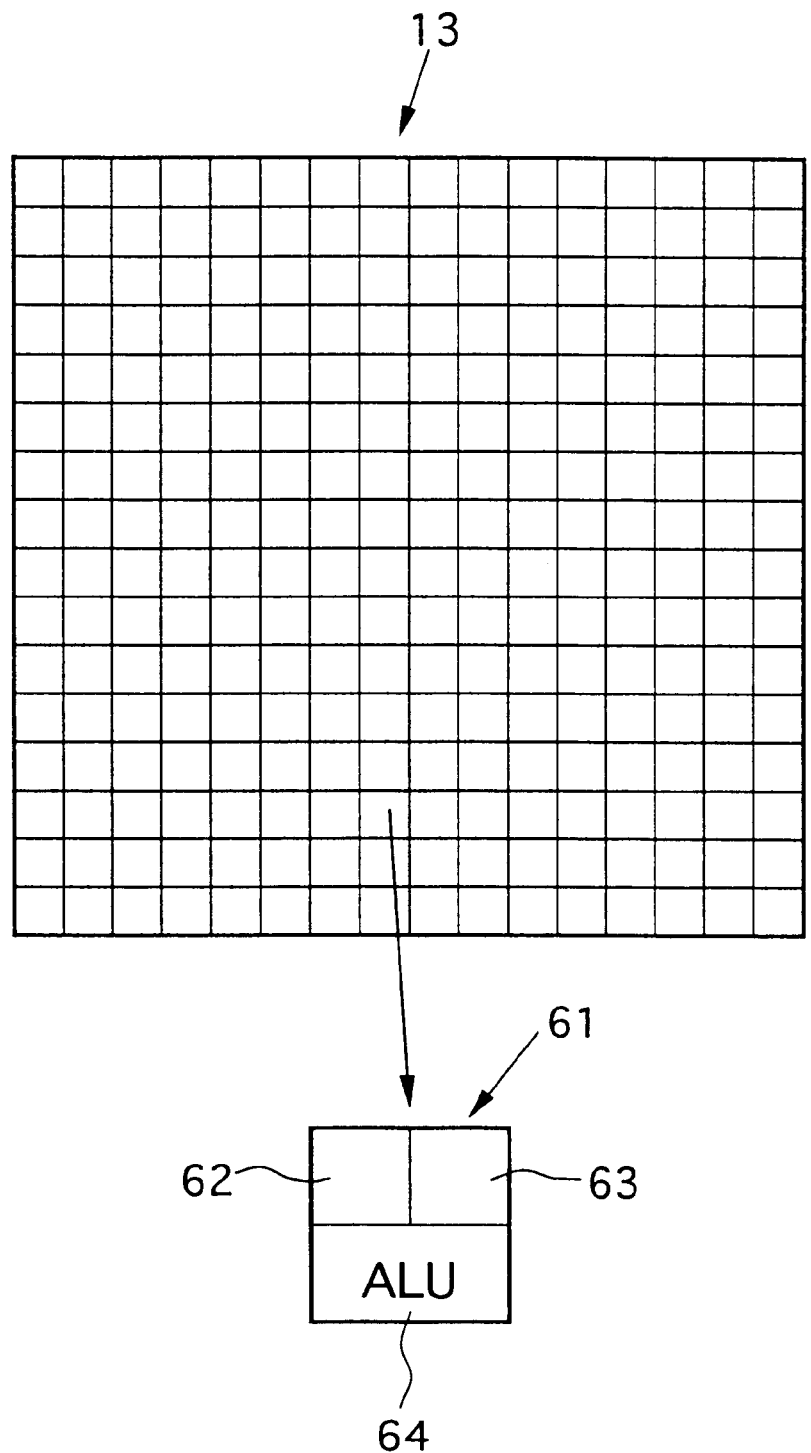
FIG. 5 is a plan view for explaining a specific example of the structure of a frame memory.

FIG. 5 illustrates a specific embodiment of the frame memory 13. The frame memory 13 formed of a dual port memory is designed such that each memory element 61 thereof is stored in advance with a reference pixel data 62 (fixed value), and a sampling pixel data 63 (variable value) which is obtained during the operation is also memorized therein. At the same time, the comparison between the reference pixel data 62 and the sampling pixel data 63 is performed by means of an ALU 64 (arithmetic unit), thereby performing the detection of the moving boards 1. Thereafter, the brightness data thus sampled and the data of difference (data of processed results) are data output one horizontal line by one horizontal line to the line buffer 15. After these data are processed at the pipe line processor 16, the resultant output image data is data output to the image synthesizing B memory 18.

Figure 6:
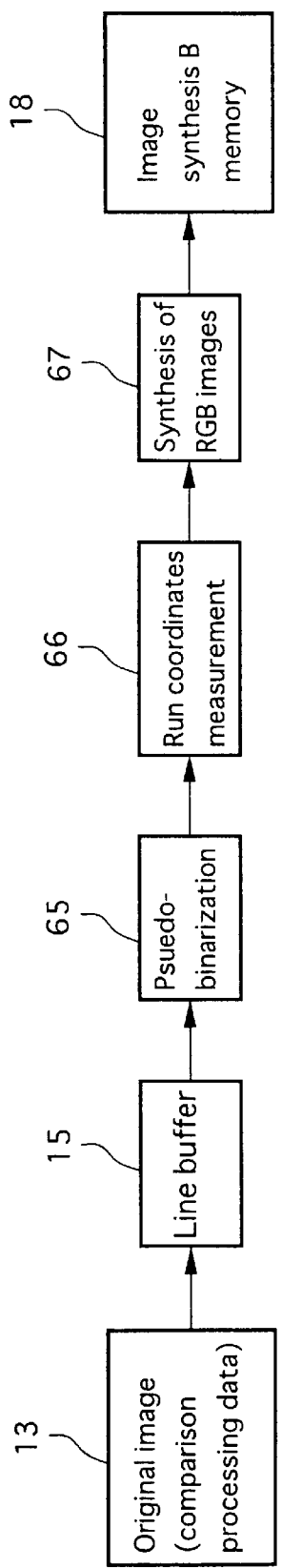
FIG. 6 is a block diagram explaining specific example of the construction of a pipe line treating processor.

FIG. 6 illustrates a specific embodiment of the pipe line processor 16. The pipe line processor 16 is constructed such that the aforementioned pseudo-binarization is performed at a processing module (1) 65, and based on this binarized data, a run coordinate measurement is performed at a processing module (2) 66. Then, based on the measured results, the synthesis of RGB images is performed at a processing module (3) 67. By performing the processing of data just like a pipe line, the real time processing can be realized with an excellent cost performance.

The aforementioned run coordinate measurement is a processing of measuring a coordinate in the binary image raster direction, wherein an address value when the binary image accessed in the raster direction becomes "1" at first, and the last address value when the image of "1" becomes "0" are recorded in a table. The couple of values thus recorded becomes a data indicating the scope of colored pixels (e.g., in orange color) in the horizontal direction. Thereafter, this data is converted into a predetermined RGB display data by means of the processing module (3) 67.

In the case where the image of the moving boards 1 is not detected by the horizontal line thereof, the input data is not altered in the processing modules (1) 65 and (2) 66, but is converted into a display data in the processing module (3) 67.

Figure 7:
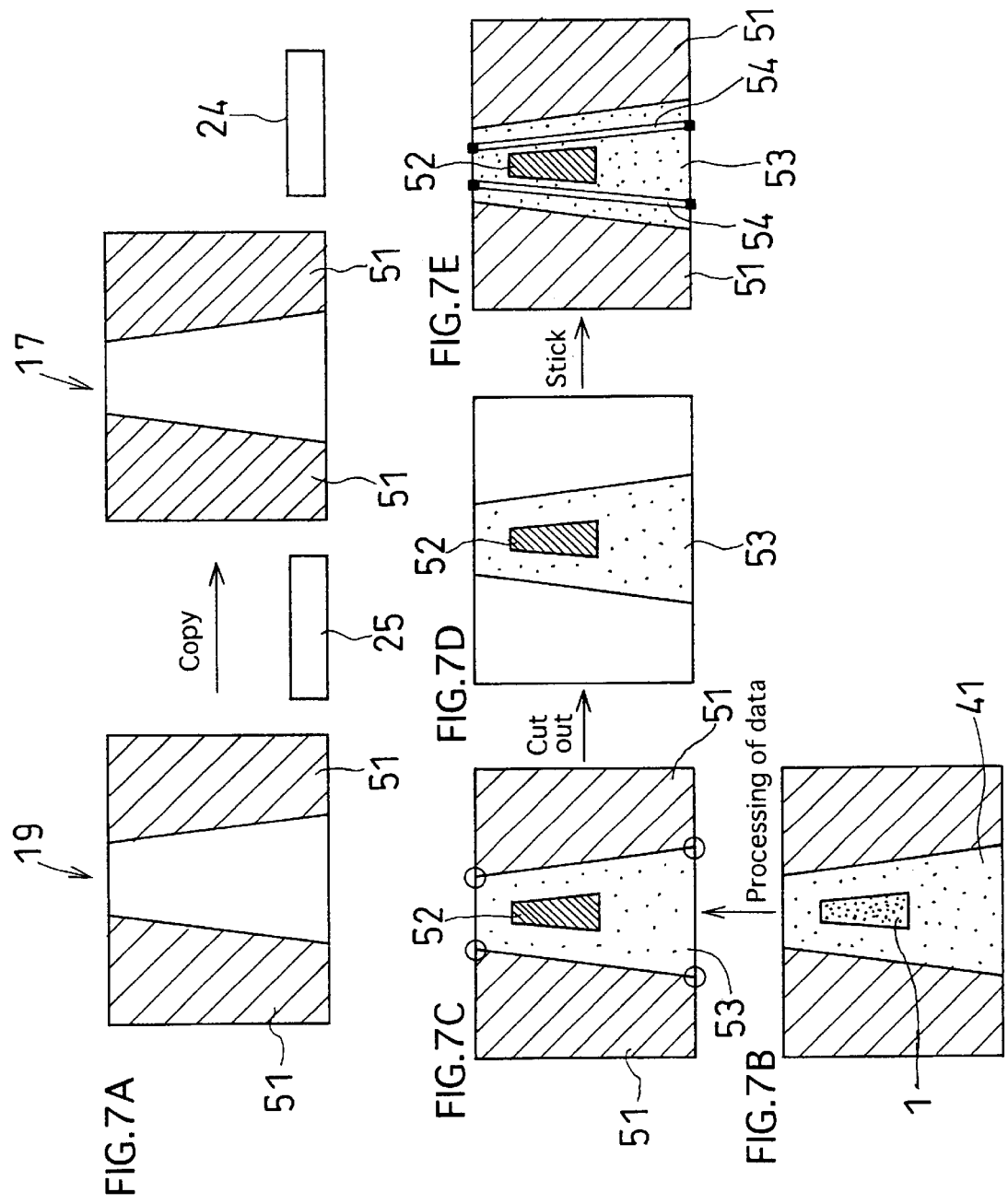
FIGS. 7A through 7E show respectively a schematic diagram illustrating, by way images, one example of the sequence for processing specific data for the purpose of synthesizing a monitoring image.
Figure 8:
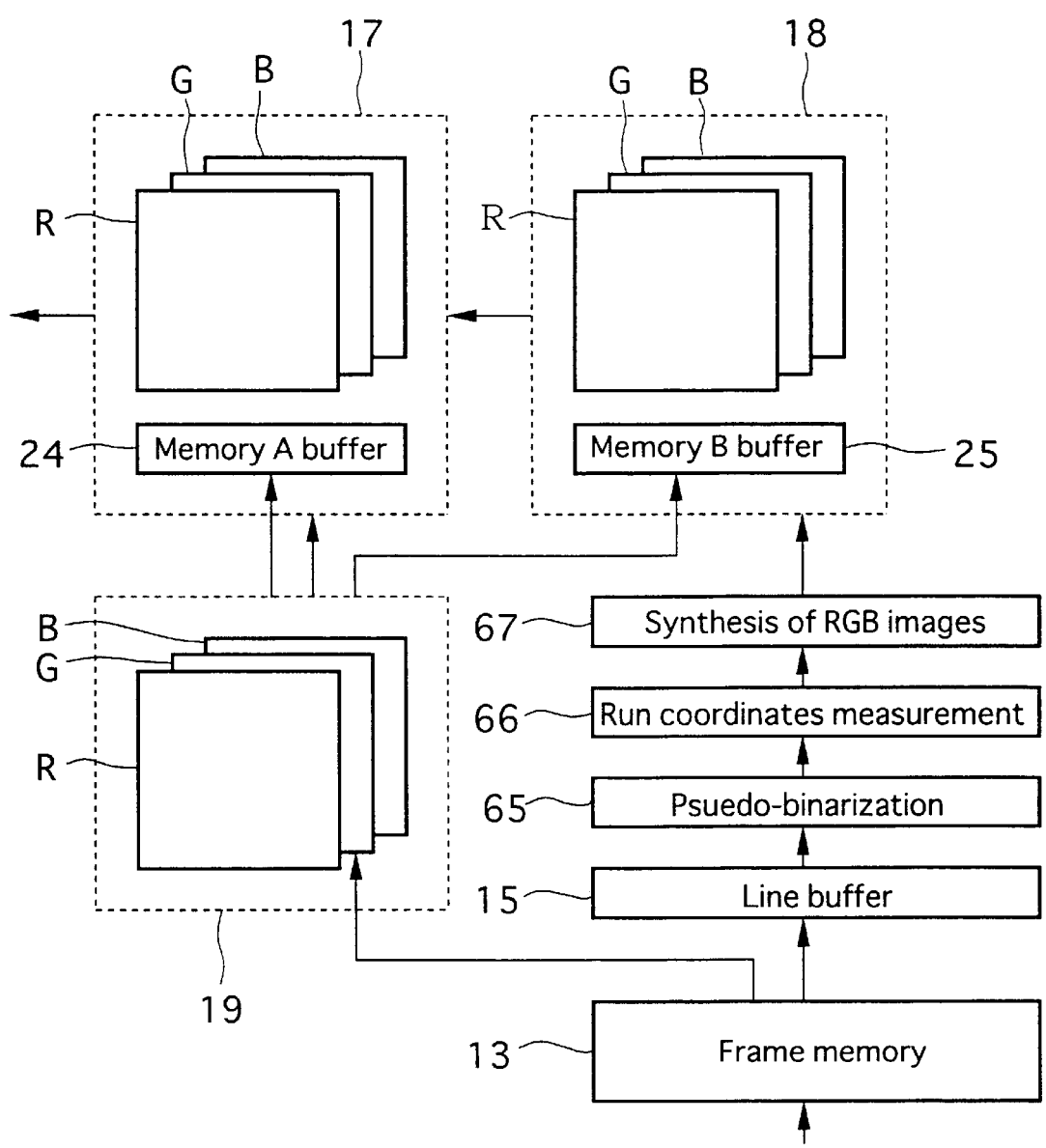
FIG. 8 is a block diagram explaining the relationship of connection between the memories.

FIG. 7 generally show schematic diagrams illustrating, by way images, the sequence for processing specific data for the purpose of synthesizing a monitoring image. FIG. 8 is a block diagram explaining the connecting relationship among the memories, i.e., the frame memory 13, the image synthesizing A memory 17, the image synthesizing B memory 18 and the stationary image memory 19.

FIG. 7A is shown to illustrate that the stationary portion 51 is recorded as a fixed color data, wherein the scene (a fraction of one scene of an odd number field) where the moving boards 1 are not being moved is stored in the frame memory 13 so as to freeze and display it in a monitor display 26, and this scene is then subjected to a data-processing and recorded as a data of the aforementioned stationary portion in the stationary image memory 19.

As for the contents of the data-processing, it includes a process to divide the display picture into two display regions, i.e., the stationary portion 51 and the quasi-animation portion 53, the stationary portion 51 being subsequently entirely colored into green of predetermined density, and a process to determine the location of a couple of moving control lines 54 that should be displayed in the quasi-animation portion 53.

As a result of this data-processing, only the image data of a single green color of the stationary portion 51 wherein no data is existed in the display region of the quasi-animation portion 53 is recorded in the stationary image memory 19. Thereafter, this data is copied in the image synthesizing A memory 17. The address data of a couple of the moving control lines 54 is stored in the memory A buffer 24 stored in the image synthesizing A memory 17. The address data of four representative points defining the boundary of the stationary portion 51 is stored in the memory B buffer 25 stored in the image synthesizing B memory 18.

FIGS. 7B–7E illustrates the recording of the animation display region, i.e., the animation portion 52 and the quasi-animation portion 53, wherein a fraction of image data corresponding to one field (FIG. 7B) that is to be stored in the frame memory 13 is subjected to a data-processing by means of the aforementioned pipe line processor 16 and recorded in the image synthesizing B memory 18 (FIG. 7C). Further, the data on the corresponding animation display region is cut out, and the data of this cutout portion (FIG. 7D) is stuck to the data blank portion of the stationary portion 51 which has been copied in advance in the image synthesizing A memory 17 (FIG. 7E), thus synthesizing a display picture.

On the occasion of the cutout of data of the animation display region (FIG. 7D), the address data of four boundary points of the stationary portion (a white circle portion in FIG. 7C) which are recorded in the memory B buffer 25 can be employed.

Thereafter, the data on the position of the cut out portion is substituted by a yellow image data of predetermined concentration by making use of the address data of a couple of the right and left moving control lines 54 that has been stored in the memory A buffer 24 disposed inside the image synthesizing A memory 17 (a black square display portion in FIG. 7E).

Figure 9A:
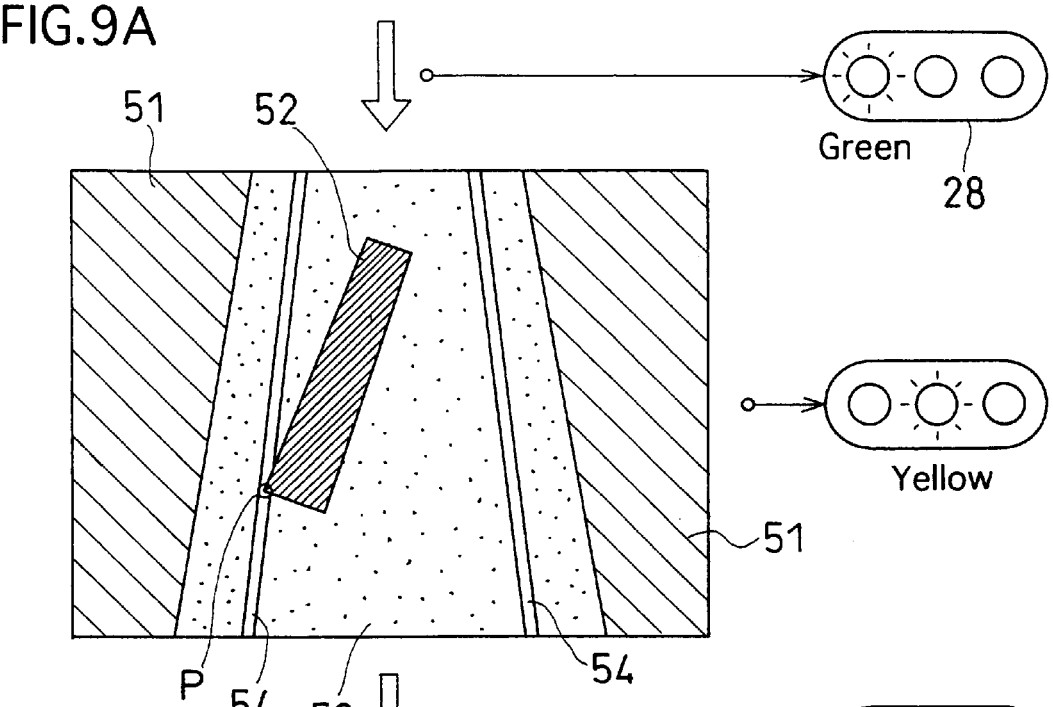
FIGS. 9A and 9B show respectively a schematic diagram illustrating a first embodiment of alarm means for informing a moving trouble.
Figure 9B:
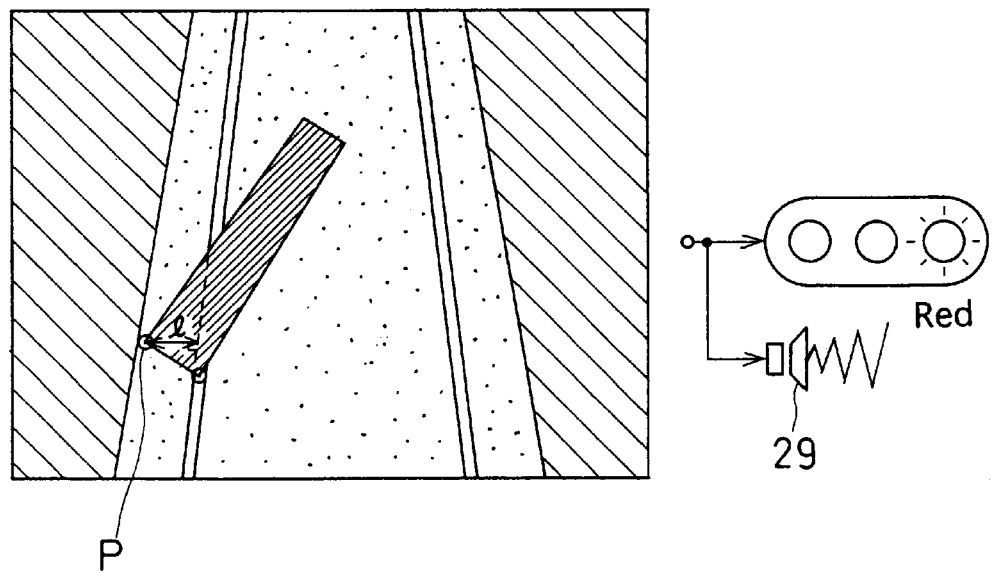

FIG. 9 illustrates a first embodiment of moving trouble alarm means which is designed to detect the off-course of the moving boards 1 from a predetermined course zone, and to output an alarm. Specifically, FIG. 9A shows the normal moving of the moving boards 1. In this case, when the moving boards 1 moving in a moving condition where a green lamp in the moving condition informing lamp 28 is lightened is shifted laterally causing the animation portion 52 of the moving boards 1 to partially superimpose on the moving control line 54, this fact is immediately detected by the moving trouble detecting circuit 21, thus switching the lighting of green lamp to the lighting of yellow lamp. Further, if the animation portion 52 is further shifted passing beyond the moving control line 54, thus increasing the magnitude of dislocation "1" thereof, the lighting of yellow lamp is switched to the flashing of yellow lamp. Now, referring to FIG. 9B, if the magnitude of dislocation "1" reaches a specified value, the flashing of yellow lamp is switched to the lighting of red lamp and at the same time, the alarm buzzer 29 is switched on, thus informing a serious trouble. In this case, the magnitude of dislocation "1" is assessed after the correction of distance is performed as explained below.

Figure 10A:
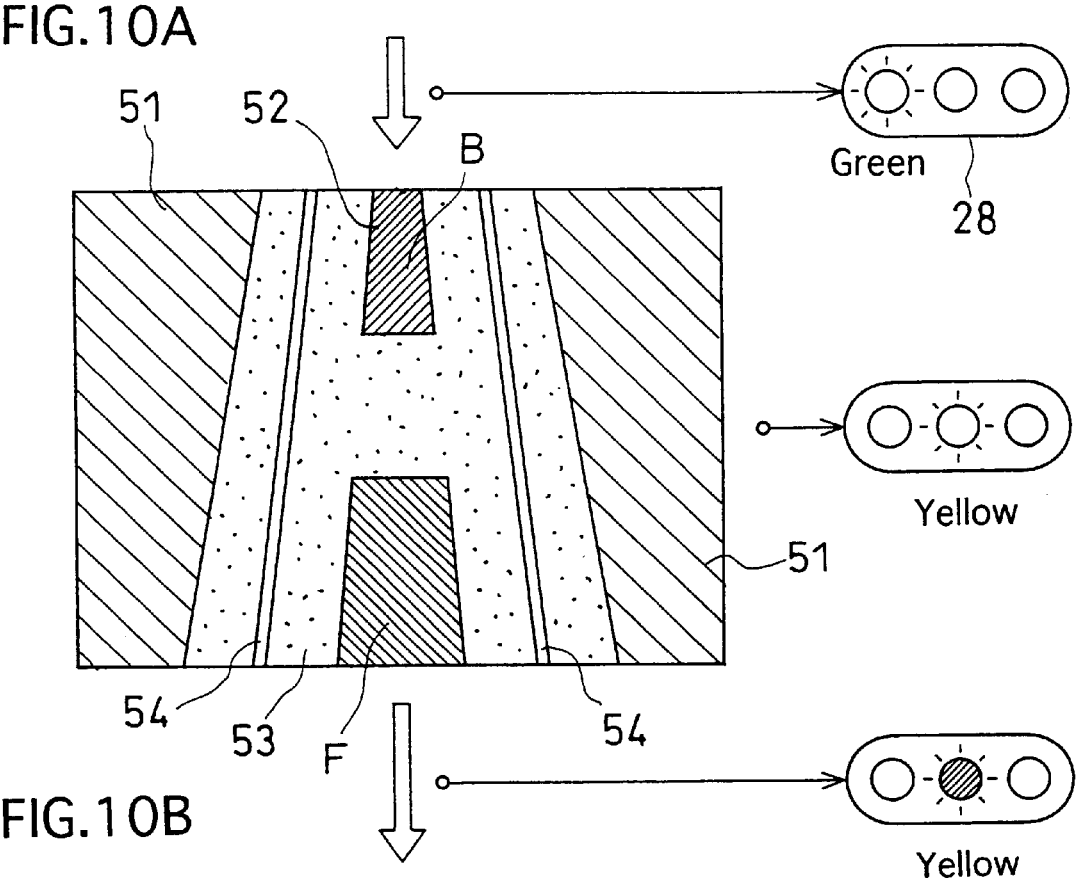
FIGS. 10A and 10B show respectively a schematic diagram illustrating a second embodiment of alarm means for informing a moving trouble.
Figure 10B:
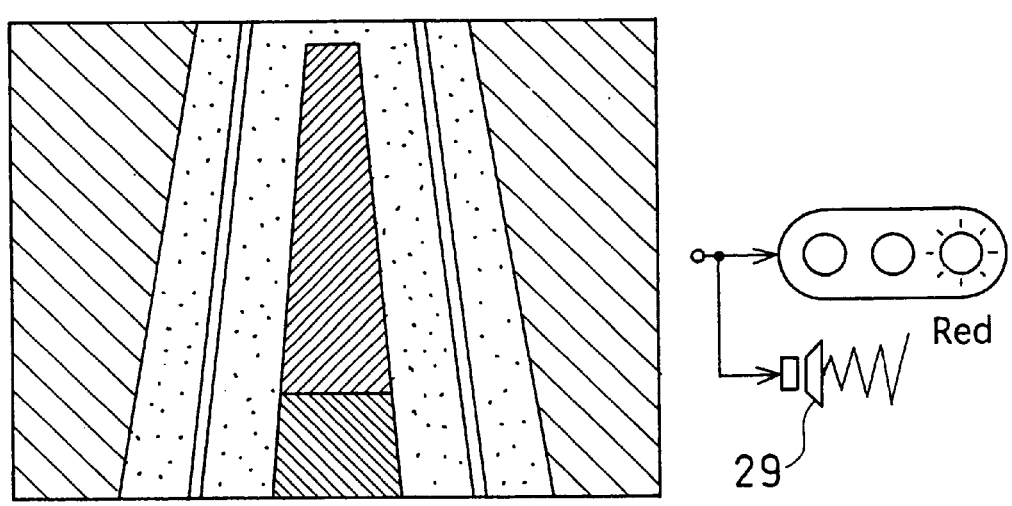

FIG. 10 illustrates a second embodiment of a moving trouble alarm means which is designed to detect of trouble that a pair of neighboring moving boards 1 have approached too close to each other, and to give an alarm. Specifically, FIG. 10A shows the normal moving of the moving boards 1 wherein a green lamp is lightened. In this case, the address (coordinates) of the pixel located at the lowest edge of the rear moving board B which is colored orange and the address (coordinates) of the pixel located at the highest edge of the fore moving board F which is colored orange are respectively detected, and then, the distance between both pixels is calculated, thereby determining the distance between these neighboring moving boards. In this case, since the image represents a scene which has been taken by a TV camera 11 disposed at an obliquely upward position in relative to the scene, the correction of distance is performed.

In this case, when the distance between the neighboring moving boards 1 reaches to a specified value, this fact is immediately detected by the moving trouble detecting circuit 21, thus switching the lighting of green lamp to the lighting of yellow lamp. Further, when the distance is further decreased, the lighting of yellow lamp is switched to the flashing of yellow lamp. Now, referring to FIG. 10B, if the distance between the neighboring moving boards 1 becomes zero, the flashing of yellow lamp is switched to the lighting of red lamp and at the same time, the alarm buzzer 29 is switched on, thus informing a serious trouble.

FIG. 11 illustrates the principle of correcting a discrepancy of a distance between the pixels in the lateral direction that is caused to occur depending on the position of the scanning line. The synthesized monitor image produced as explained above is of the scene which has been photographed by the TV camera 11 which is disposed at an obliquely upward position in relative to the scene. Therefore, the distance of pictured image displayed in the animation display region is not proportional to the length on the screen. Namely, the image located far away from the TV camera 11 is photographed as a smaller size, while the image located close to the TV camera 11 is photographed as a larger size. This image is a perspective transformation image to be practiced in the CAD. Therefore, the correction of the distance on the screen can be performed by making use of the processing for perspective transformation. When it is assumed that the monitoring display screen is formed of a rectangular configuration having an aspect ratio of 3:4, the actual width "A" of the far end side of the quasi-animation portion 53 shown in FIG. 11A becomes "a" on the monitoring screen "M" of the TV camera 11 shown in FIG. 11B, while the actual width "B" of the near end side of the quasi-animation portion 53 becomes "b" on the monitoring screen "M". To correct these values, the actual distance X corresponding to the critical range of lateral view field of the far end side as well as the actual distance Y corresponding to the critical range of lateral view field of the near end side are measured, and, based on the values measured of X and Y, the distance per the number of pixel (distance/the number of pixel) is calculated on each scanning line under the condition that the number of pixel in the lateral direction is assumed as being 640 (=480×4/3). The values of the ratio thus calculated are then represented in Table "A" (FIG. 11C), thus making it possible to easily determine the actual lateral distance at each scanning line can be obtained if the number of pixel in the lateral direction is determined.

FIG. 12 illustrates the principle of correcting a discrepancy of a distance between the scanning lines that is caused to occur depending on the position of the scanning line. As shown in FIG. 12A, the TV camera 11 is placed at a view point V having a height "h" as measured from the moving boards 1, and disposed in such a manner that the TV camera 11 is directed obliquely downward in relative to the moving direction "T" of the moving boards 1 so as to photograph the region to be defined by "M" in monitoring screen, $\theta_1$ to $\theta_2$ in elevation angle and "L" in distance. In this case, if the angle between the line connecting the origin with the lowermost edge of the monitoring screen "M" and the line connecting the origin with a point on the "M" which is away from the Aforementioned lowermost edge by a distance of di is defined by β as shown in FIG. 12B representing an enlarged view of the monitoring screen as well as the region in the vicinity thereof, the following equations can be established:

$$l_1 \sin \beta = di \sin (\alpha+\beta) \quad (1)$$

wherein $l_1$ is α known distance and a is a known angle; therefore β can be determined, thus;

$$\theta_i = \theta_2 - \beta \quad (2)$$

therefore $\theta_1$ can be determined, so that $$L_i = h(\tan^{-1}\theta_i - \tan^{-1} \theta_2) \quad (3)$$

Namely, the distance Li between the nearest point of the monitoring region as viewed through the monitoring screen "M" and an arbitrary scanning line which is spaced away from the aforementioned lowest point by a distance of di can be determined. When the distance Li is calculated in this manner for each scanning line and then, placed in Table "B" (FIG. 12C), the actual distance coordinates of each scanning line can be easily determined.

Figure 13:
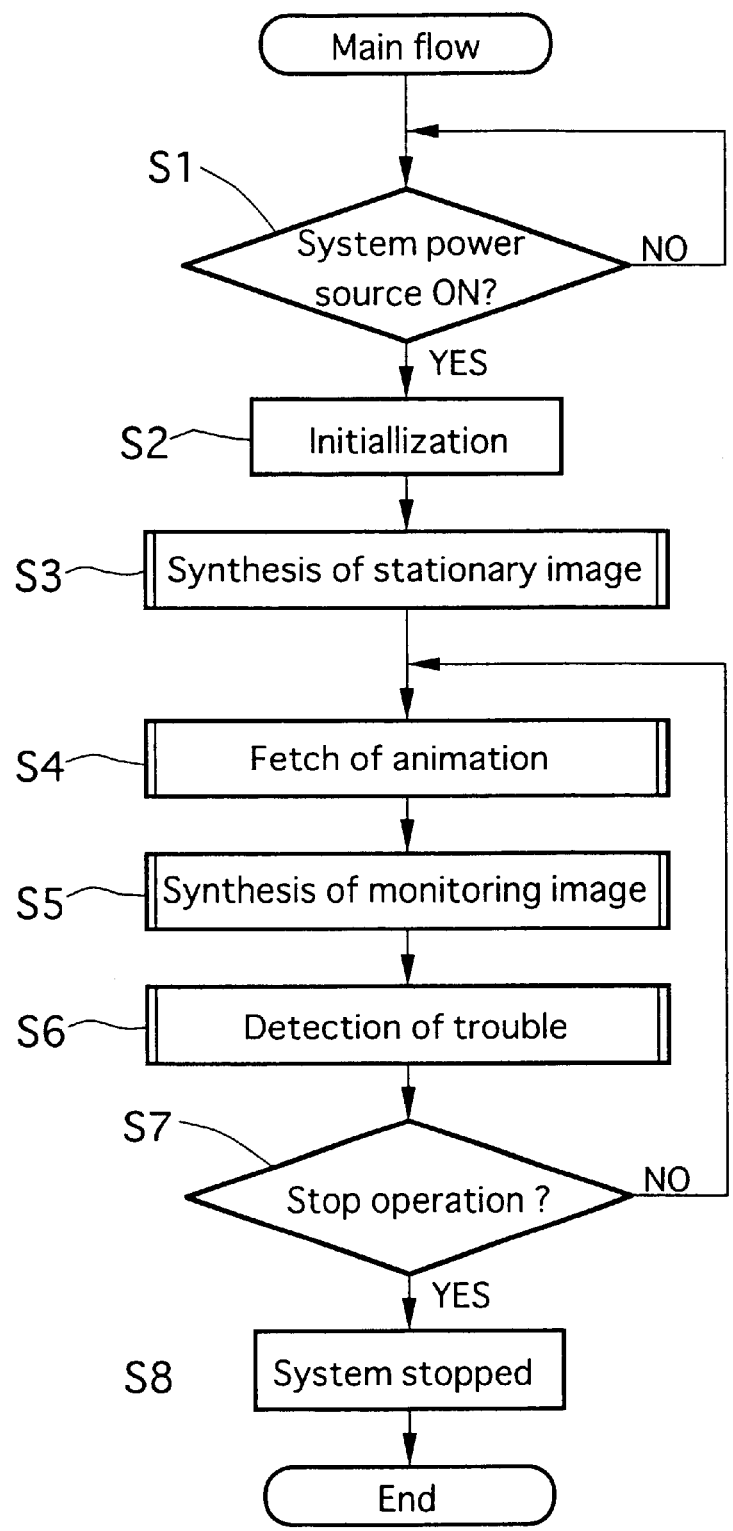
FIG. 13 is a main flow chart explaining the fundamental process of one embodiment according to the present invention.

FIG. 13 is a main flow chart explaining the fundamental process of this embodiment. First of all, a judgment is made as to whether or not the system electric source should be turned ON (step S1). If the answer is NO, waiting is continued until the system electric source is turned ON. If the answer is YES, the initialization of such as data is performed (step S2).

Then, the synthesis of stationary image is performed at the step S3 (to be explained in detail with reference to FIG. 14); the fetch of animation images is performed at the step S4; the synthesis of monitoring image is performed at the step S5 (to be explained in detail with reference to FIG. 16); the detection of moving trouble is performed at the step S6 (to be explained in detail with reference to FIG. 18); a judgment is made at the step 7 as to whether or not the operation of system should be stopped or not, and if the answer is NO, the procedure is returned to the step S4 so as to continue the fetch of the animation images, and if the answer is YES, the finishing of the system is performed at the step 8, thus finishing the flow.

Figure 14:
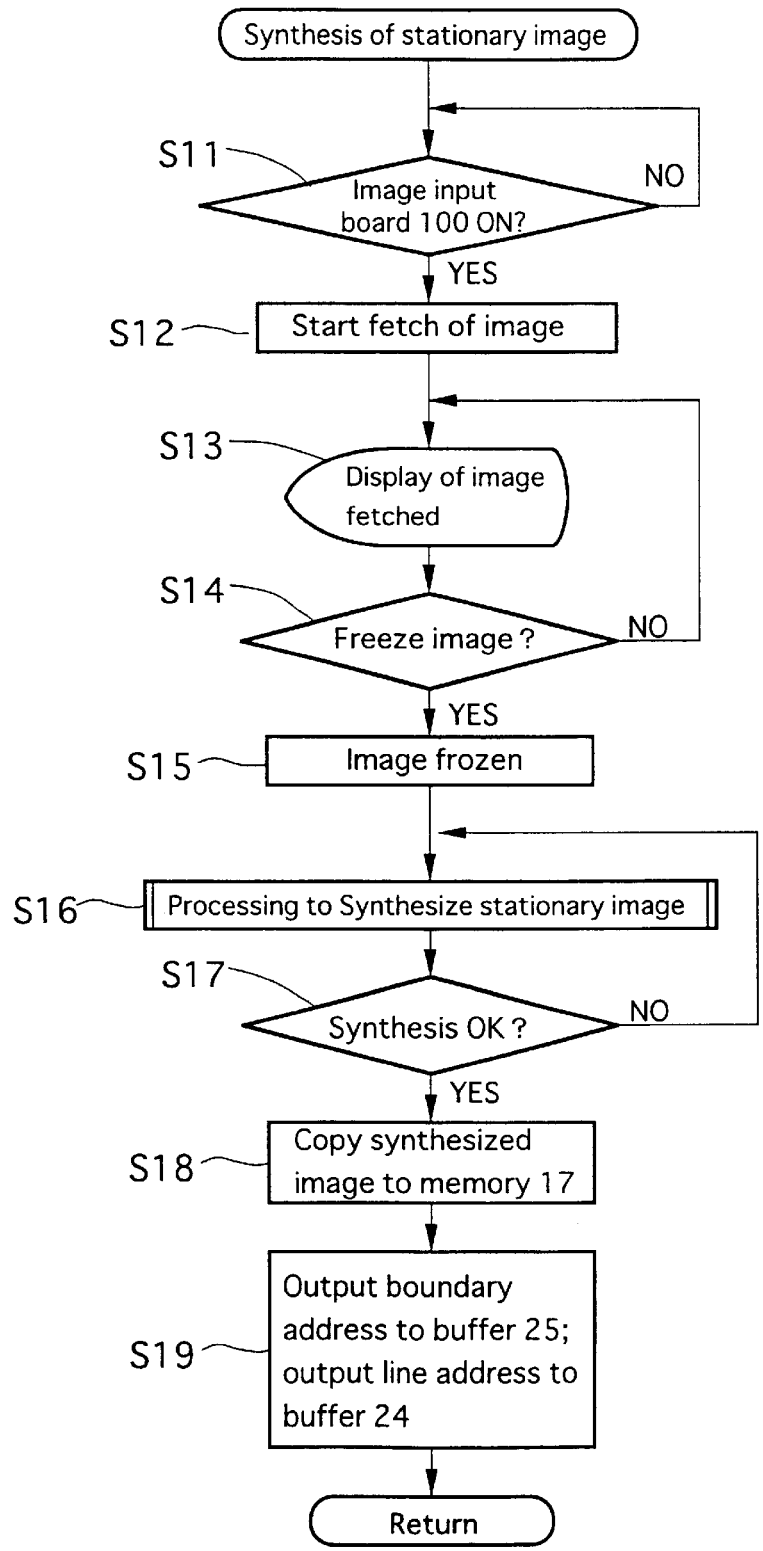
FIG. 14 is a flow chart explaining in detail the process of synthesizing a stationary image in one embodiment according to the present invention.

FIG. 14 is a flow chart explaining in detail the process of synthesizing a stationary image (step S3) according to this embodiment. First of all, a judgment is made at the step S11 as to whether or not the image input board 100 is ON. If the answer is NO, waiting is continued until the image input board 100 is turned ON. If the answer is YES, the fetch of images as the reference pixel data 62 (fixed value) into the frame memory 13 is started, and then, stored in the stationary image memory 19 (step S12).

Then, the digital signal of the images thus fetched is converted into an analog signal by making use of the D/A conversion circuit 20 at the step S13. Thereafter, the analog signal thus obtained is displayed in the monitoring display 26 through which a judgment is made as to whether or not the freezing of image should be performed (step S14). If the answer is NO and the freezing of image is not instructed, the display of image is allowed to continue. On the other hand, if the answer is YES, so that the TV camera 11 is installed at suitable places. If the freezing of image is instructed, the freezing of image is performed. Namely, the reference pixel data 62 (fixed value) of the frame memory 13 is finally determined (step S15), thus allowing to start the synthesizing process of stationary image (step 16).

As a result, the boundary of the stationary portion 51 and the moving control line 54 are finally determined, and only the image data of a single green color of the stationary portion 51 wherein no data is existed in the display region of the quasi-animation portion 53 is recorded in the stationary image memory 19. Thereafter, at the step S17, a judgment as to whether or not the synthesis of image is finished with OK is made. If the answer is NO and the synthesis of image is not yet finished, the processing for the synthesis of image is allowed to continue. On the other hand, if it is judged that the synthesis of image is finished with OK, the synthesized image is copied in the image synthesizing A memory 17 (step S18). Additionally, the boundary point address of the stationary portion 51 is output to the memory B buffer 25, and the moving control line address is output to the memory A buffer 24 (step S19). Thereafter, the procedure is returned to the step S4.

Figure 15:
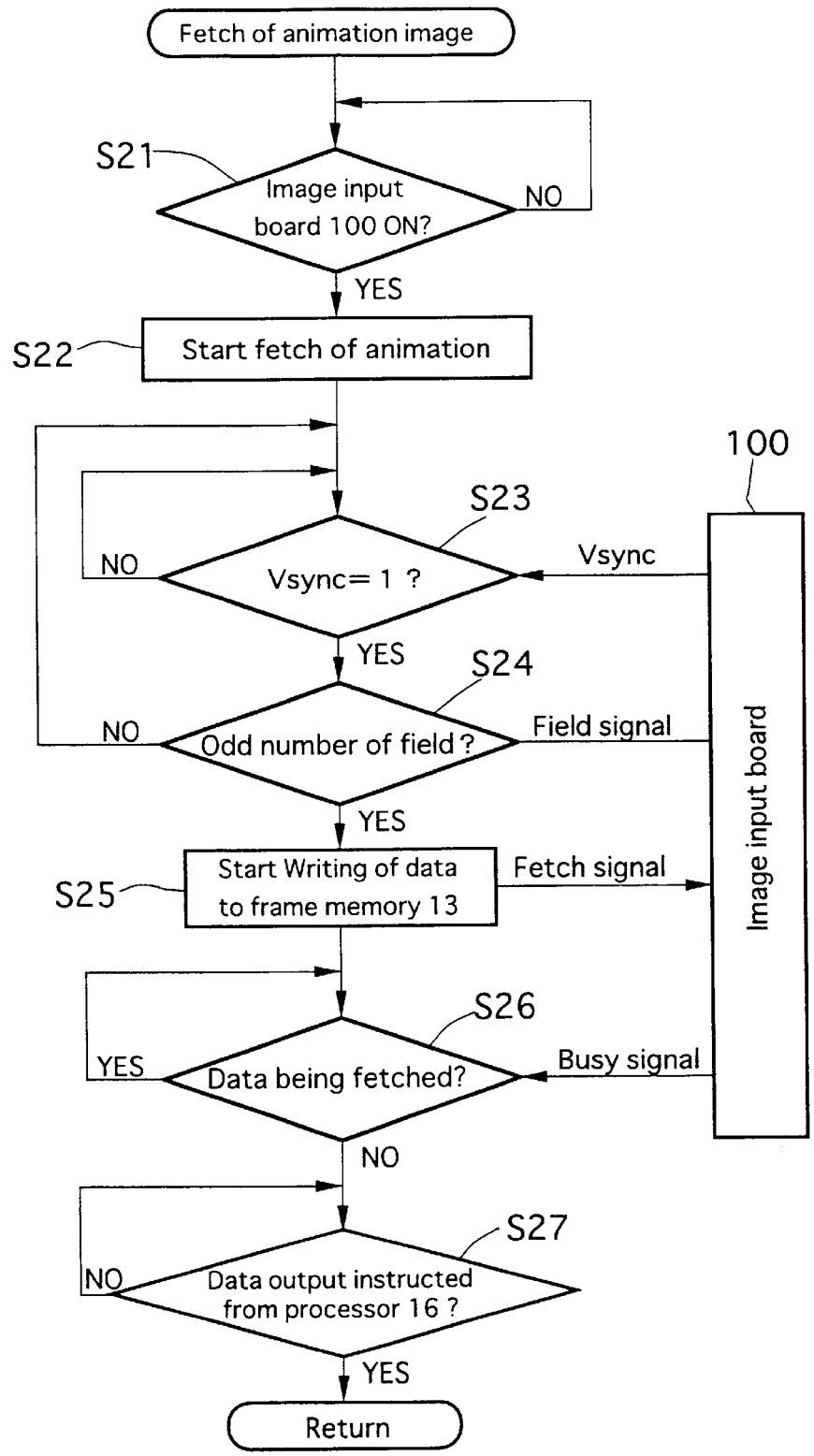
FIG. 15 is a flow chart explaining in detail the process of fetching an animation image in one embodiment according to the present invention.

FIG. 15 is a flow chart explaining in detail the process of fetching an animation image (step S4) according to this embodiment. First of all, a judgment is made at the step S21 as to whether or not the image input board 100 is ON. If the answer is NO, waiting is continued until the image input board 100 is turned ON. If the answer is YES, the fetch of animation image is started (step S22). Namely, a judgment is made as to whether or not the vertical synchronous signal Vsync is 1, or whether or not the vertical synchronous signal Vsync exists (step S23). If the answer is NO, waiting is continued until the vertical synchronous signal Vsync is input. If the answer is YES, a judgment is made as to whether or not the animation image that has been fetched is that of an odd number field (step S24). If the answer is NO, the procedure is returned to the step S23, waiting for until the animation image becomes that of an odd number field. On the other hand, if the answer is YES, the writing of images as the sampling pixel data 63 (variable value) into the frame memory 13 is started (step S25). Further, a judgment is made as to whether or not the data is being data output into the frame memory 13 (step S26). If the answer is YES and the data is being fetched into the frame memory 13, the finishing of fetch is waited for. If the answer is NO and the fetch has been finished, a judgment is made as to whether or not there is an instruction of data output from the pipe line processor 16 (step S27). If the answer is NO and the instruction of data output is not existed, the instruction is waited for. If the answer is YES and the instruction of data output is existed, the procedure is returned to the step S5.

Figure 16:
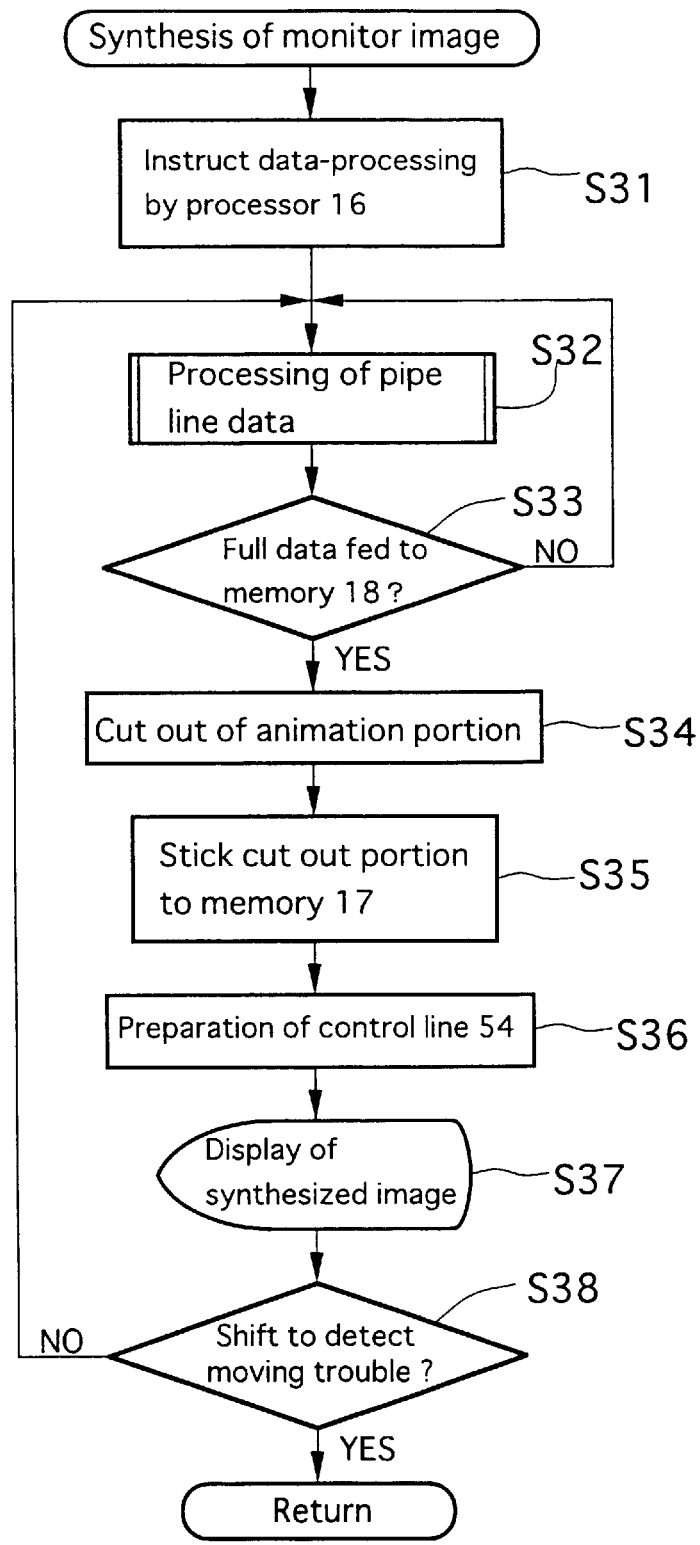
FIG. 16 is a flow chart explaining in detail the process of synthesizing a monitored image in one embodiment according to the present invention.

FIG. 16 is a flow chart explaining in detail the process of synthesizing a monitored image (step S5) according to this embodiment. First of all, an instruction of data processing is made at the step S31 against the pipe line processor 16, and hence, the pipe line data processing (to be explained in detail with reference to FIG. 17) is executed (step S32). Then, a judgment is made as to whether or not a sufficient volume of data corresponding to one full frame has been stored as a full data to the image synthesizing B memory 18. If the answer is NO and the data is yet a full data, waiting is continued. On the other hand, if the answer is YES and the storage of the full data has been finished, the data on the corresponding animation display region is cut out by making use of the boundary point address data of the stationary portion 51 that has been stored in the image synthesizing B memory 18 (step S34), and the animation image of this cutout portion is stuck to a corresponding portion of the image synthesizing A memory 17 (step S35). Then, a moving control line 54 is created by making use of a moving control line address data that has been stored in the memory buffer 24 (step S36), and the synthesized image is displayed in the monitor display 26 (step S37) so as to judge as to whether or not the procedure should be shifted to the process of detecting moving trouble (step S38). If the answer is NO and the detection of trouble is not yet required to be started, the procedure is returned to the step S32 thereby continuing the synthesis of a monitoring image. If the answer is YES and the detection of trouble is required to be started, the procedure is returned to the step S6.

Figure 17:
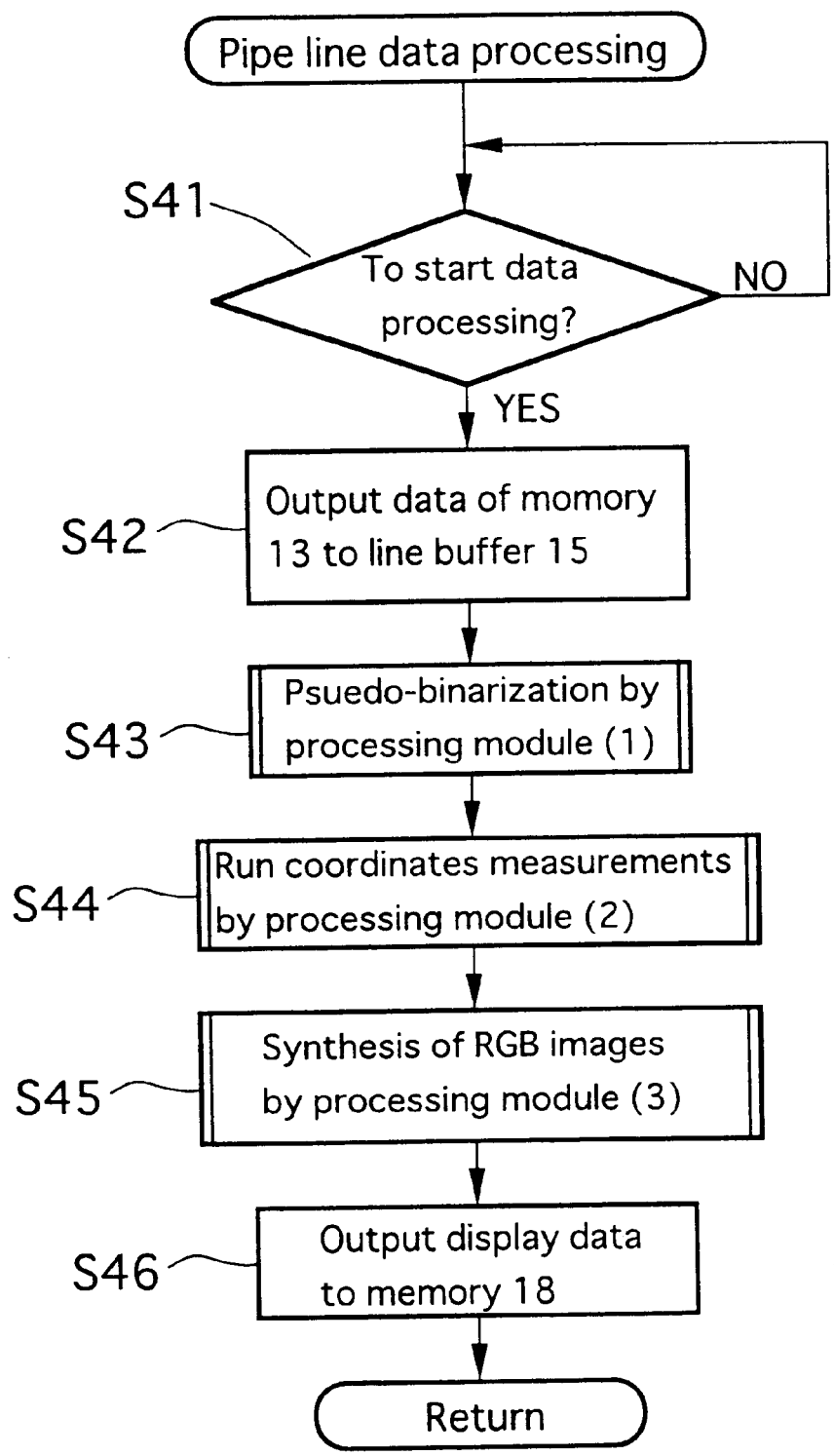
FIG. 17 is a flow chart explaining in detail the process of treating a pipe line data in one embodiment according to the present invention.

FIG. 17 is a flow chart explaining in detail the pipe line data processing (step S32) according to this embodiment. First of all, a judgment is made as to whether or not there is an instruction to start a data processing at the step S41. If the answer is NO, the instruction is waited for. If the answer is YES and the instruction to start the processing is existed, the sampled brightness data in the frame memory 13 and a differential data (data resulted from the processing) are started to data output, one horizontal line by one horizontal line, to the line buffer 15 (step S42). Then, the pseudo-binarization is performed at a processing module (1) 65 at the step S43. Namely, unless the differential value exceeds over a predetermined threshold value, the brightness data is left as it is, while if the differential value exceeds over a predetermined threshold value, the value is defined as "1". At the step S44, the measurement of run coordinates of the processing module (2) 66 is performed. Namely, a block configuration wherein the value "1" is linked together is detected. Then at the step S45, the synthesis of RGB images is performed at a processing module (3) 67. Namely, based on the data obtained from the measurement of run coordinates, the image of the moving boards 1 is converted into an orange color display data, and the residual background portions are left to remain as a brightness data. Then, the display data prepared in the step S46 is output to the image synthesizing B memory 18, after which the procedure is returned to the step S33.

Figure 18:
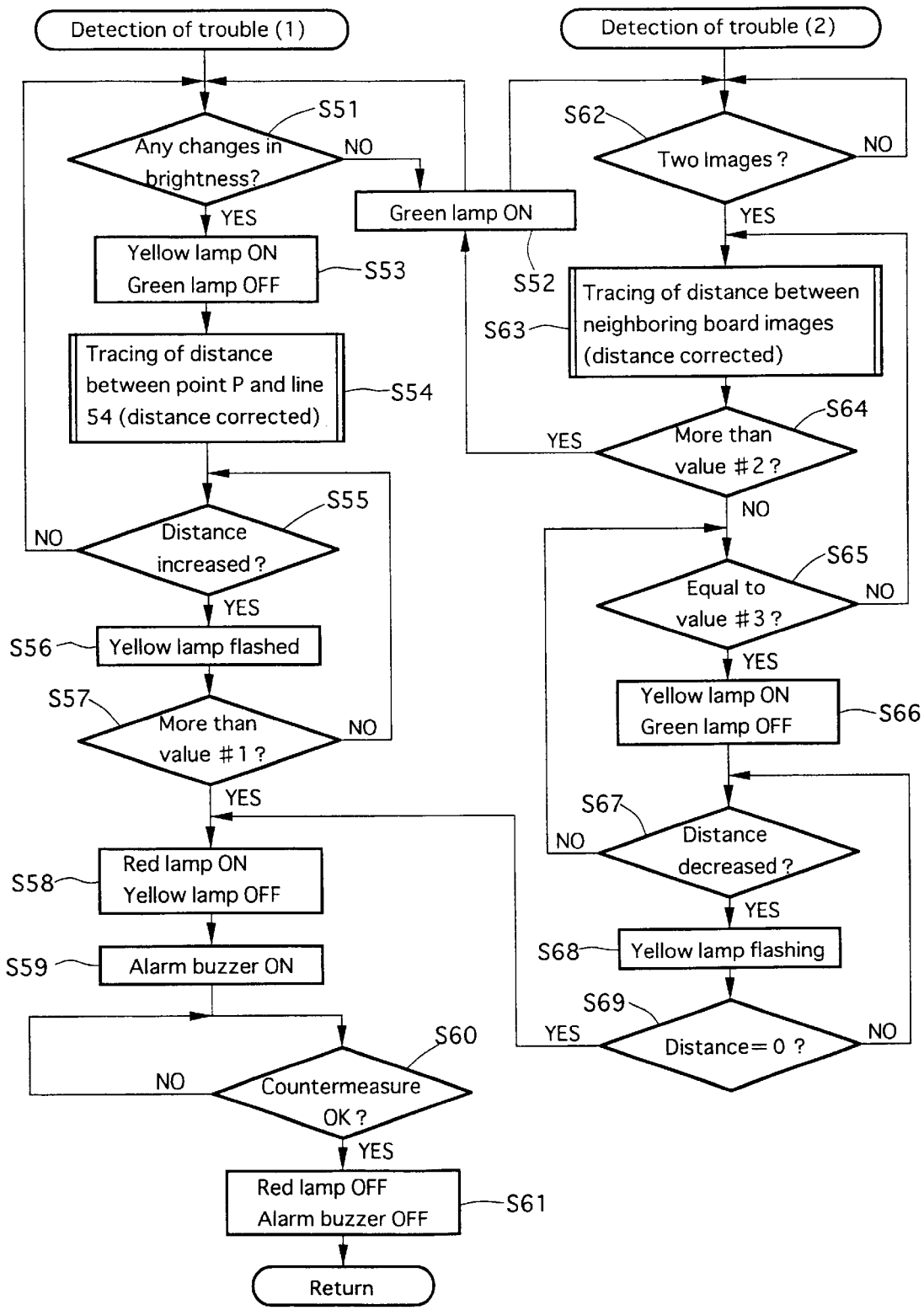
FIG. 18 is a flow chart explaining in detail the process of detecting moving trouble of work boards in one embodiment according to the present invention.

FIG. 18 is a flow chart explaining in detail the detection of moving trouble (step S6) according to this embodiment. First of all, a judgment is made as to whether or not there is any change in brightness of the moving control line 54 at the step S51 in the detection of moving trouble (1) which is adapted to detect any off-course of moving boards from the moving control zone. If the answer is NO and there is little change in brightness, thus indicating a normal moving state of moving boards, a green lamp is kept lightened (step S52). If the answer is YES and there is a change in brightness, a yellow lamp is lightened and the green lamp is switched off (step S53). Then, the distance between the distal end point P of the image of boards and the moving control line 54 is traced (step S54). In this case, the correction of distance is performed as explained with reference to FIG. 11. Thereafter, a judgment is made as to whether or not this distance is increasing or not (step S55). If the answer is NO and there is little increase in distance, the procedure is returned to the step S51. If the answer is YES and there is an increase in distance, the yellow lamp is flashed (step S56).

Further, a judgment is made as to whether or not this distance exceeds over a predetermined value #1 (step S57). If the answer is NO and this distance does not exceed over the predetermined value, the procedure is returned to the step S55. If the answer is YES and this distance is exceeded over the predetermined value #1, a red lamp is lightened as an alarm for the happening of an moving trouble, and the yellow lamp is switched off (step S58), and at the same time, an alarm buzzer is turned ON (step S59). Then, a judgment is made as to whether or not a countermeasure has been accomplished (step S60). If the answer is NO and the countermeasure is not accomplished, the procedure is kept stopped until the countermeasure is accomplished. If the answer is YES and the countermeasure has been already accomplished, a red lamp is turned off and at the same time, an alarm buzzer is also turned OFF (step S61) and the procedure is returned to the step S7.

Thereafter, a judgment is made as to whether or not there are a couple of the images of moving boards at the step S62 in the detection of moving trouble (2) which is adapted to detect the distance between the moving boards. If the answer is NO and the procedure is stopped until a couple of the images can be seen therein. On the other hand, if the answer is YES and there are a couple of the images, the distance between the lowermost end point of the image of the upper boards and the uppermost end point of the image of the lower boards is traced (step S63). In this case, the correction of distance is performed as explained with reference to FIG. 12. Thereafter, a judgment is made as to whether or not this distance exceeds over a predetermined value #2 (step S64). If the answer is YES and this distance is exceeded over this predetermined value, thus indicating the normal condition, a green lamp is kept lightened (step S52). If the answer is NO and this distance does not exceed over this predetermined value, a judgment is further made as to whether or not this distance is of a predetermined value #3 (step S65). If the answer is NO and this distance is not of this predetermined value #3, the procedure is returned to the step S63 so as to trace this distance. On the other hand, if the answer is YES and this distance is of a predetermined value #3, the yellow lamp is lightened and the green lamp is turned off (step S66). Thereafter, a judgment is made as to whether or not this distance is decreasing (step S67). If the answer is NO and this distance is not decreasing, the procedure is returned to the step S65. On the other hand, if the answer is YES and this distance is decreasing, the yellow lamp is flashed (step S68). Additionally, a judgment is made as to whether or not this distance is zero (step S69). If the answer is NO and this distance is not zero, the procedure is returned to the step S67. On the other hand, if the answer is YES and this distance is zero, thus indicating a trouble situation, and the procedure is advanced to the step S58.

It should be noted that the present invention is not limited to the aforementioned embodiments.

For example, the aforementioned reference pixel data may not be of those of one field, but may be of an average value of the image data of a plurality of fields.

Further, according to the present invention, the recording medium may be constructed such that it is readable by a computer and stores therein a program for enabling the computer to function as "an image processing means" or as "an image processing means and trouble-detecting means" of a moving trouble monitoring system. For example, the recording medium may be formed of a magnetic tape, a CD-ROM, an IC card, a RAM card, etc.

According to the monitoring system for watching moving trouble of work boards of the present invention, it is possible to automatically and reliably detect to any moving trouble of boards and to inform a person in charge of such trouble through the visual or auditory sense of the person, thereby enabling the person to recognize such trouble and to immediately take a suitable countermeasure. Accordingly, the generation of serious troubles that defective products may be increasingly produced due to a delay in finding the moving trouble of work boards, the troubles being peculiar to a continuous production system, can be effectively prevented to occur by making use of the present invention, thus promoting the productivity of the work boards.

All publications including patents and patent applications cited herein are fetched herein by reference in their entireties.

Obviously, numerous modifications and variations of the present invention are possible in light of the above teachings. It is therefore to be understood that within the scope of the appended claims, the invention may be practiced otherwise than as specifically described herein.

What is claimed is:

1. A monitoring system for work boards, said system comprising:

a TV camera for photographing a moving scene of work boards moving through a control zone by a transport mechanism and;

a display device for displaying an image signal of said moving scene of work boards taken by said TV camera, said display device comprising an image processing means for replacing at least a portion of said image signal of said moving scene of work boards by a series of predetermined color image signals, wherein said display device is partitioned into a stationary region with a first color, a quasi-animation region with a second color similar to said first color, and an animation display region, with a third color moving relative to said stationary region and said quasi-animation region, and a plurality of moving control lines positioned within said quasi-animation region with a forth color;

wherein the entire feature of the picture can be distinguished essentially as a whole by the three colors of said animation display region, said control lines, and the residual background portion comprised of said stationary portion and said quasi-animation portion.

2. The monitoring system according to claim 1, wherein said at least a portion of said image signal of said moving scene of work boards is a profile of work boards.

3. The monitoring system according to claim 1, wherein said image processing means is adapted to determine whether a derived input image signal originated from work boards based on a magnitude of a difference between an input signal and a background image signal prepared in advance.

4. The monitoring system according to claim 1, said system further comprising:

a displacement detecting means for detecting that said third color image signal exists in a predetermined region; and an alarm means for informing of displacement, if any, based on a detection output from said displacement detecting means.

5. The monitoring system according to claim 4, wherein said image processing means is adapted to enable an image signal of said predetermined region to be replaced by a predetermined different color image signal.

6. The monitoring system according to claim 1, said system further comprising:

a displacement detecting means for detecting that a pair of neighboring third color image signals have approached to each other within a predetermined distance on said display device; and an alarm means for informing of displacement, if any, based on a detection output from said trouble detecting means.

7. The monitoring system according to claim 1, wherein an image signal in said stationary region and/or said quasi-animation region is replaced by a different color image signal, while a brightness of an image signal in said animation display region is suppressed.

8. A computer readable storage medium having a program recorded thereon wherein said program causes a computer to operate as said image processing means of said monitoring system as claimed in claim 1.

* * * * *